United States Patent [19]

Takahara et al.

[11] Patent Number: 5,469,278
[45] Date of Patent: Nov. 21, 1995

[54] LIQUID CRYSTAL PANEL AND VIEWFINDER FOR VIDEO CAMERA AND PROJECTION DISPLAY USING LIQUID CRYSTAL PANEL

[75] Inventors: Hiroshi Takahara, Neyagawa; Hideki Ohmae, Suita, both of Japan

[73] Assignee: Matsushita Electric Industrial Co., Ltd., Osaka, Japan

[21] Appl. No.: 345,364

[22] Filed: Nov. 18, 1994

Related U.S. Application Data

[63] Continuation of Ser. No. 16,556, Feb. 11, 1993, abandoned.

[30] Foreign Application Priority Data

Sep. 25, 1992 [JP] Japan .................................. 4-256069

[51] Int. Cl.⁶ ........................................................ G02F 1/13
[52] U.S. Cl. .................. 359/51; 359/59; 359/67; 359/68
[58] Field of Search ................................ 359/59, 40, 41, 359/51, 54, 68, 67, 71; 358/60; 353/82; 354/100, 102

[56] References Cited

U.S. PATENT DOCUMENTS

| | | | |
|---|---|---|---|
| 4,613,207 | 9/1986 | Fergason | 359/51 |
| 4,977,456 | 12/1990 | Furuya | 358/213.13 |
| 5,022,750 | 6/1991 | Flasck | 359/51 |
| 5,047,847 | 9/1991 | Toda et al. | 359/40 |
| 5,107,352 | 4/1992 | Fergason | 359/51 |
| 5,117,299 | 5/1992 | Kondo et al. | 359/67 |
| 5,150,232 | 9/1992 | Gunkima et al. | 359/51 |
| 5,274,481 | 12/1993 | Kim | 359/51 |
| 5,299,289 | 3/1994 | Omae et al. | 359/51 |

FOREIGN PATENT DOCUMENTS

| | | | |
|---|---|---|---|
| 0028711 | 2/1987 | Japan | 359/68 |
| 62-111233 | 5/1987 | Japan . | |
| 63-183484 | 7/1988 | Japan . | |
| 0255832 | 10/1989 | Japan | 359/51 |
| 2-244089 | 9/1990 | Japan . | |
| 3-98022 | 4/1991 | Japan . | |
| 40-4156428 | 5/1992 | Japan | 359/68 |
| 40-4156427 | 5/1992 | Japan | 359/68 |

Primary Examiner—William L. Sikes
Assistant Examiner—Huy Mai
Attorney, Agent, or Firm—Wenderoth, Lind & Ponack

[57] ABSTRACT

A liquid crystal panel includes a liquid crystal/polymer composite between two substrates, one of which having a matrix of pixel electrodes. A mosaic color filter of red, green and blue is provided above counterelectrodes or pixel electrodes. The average pore size of the resin component or of the diameter of liquid crystal droplets in the composite is selected according to the color of the color filter. The average of pore sizes is the largest for red, and the smallest for blue. The average of pore sizes of the resin on the switching elements and on the signal lines is smaller than that on the pixel electrodes. This liquid crystal display panel is used as a light bulb for a projection type television system. This liquid crystal display panel is also used as a viewfinder of a video camera.

24 Claims, 15 Drawing Sheets

OFF

ON

LIQUID CRYSTAL PANEL AND VIEWFINDER FOR VIDEO CAMERA AND PROJECTION DISPLAY USING LIQUID CRYSTAL PANEL

This application is a continuation of now abandoned application Ser. No. 08/016,556, filed Feb. 11, 1993.

BACKGROUND OF THE INVENTION

1. Field of the Invention

The present invention relates to a liquid crystal display panel for displaying an optical image by modulating an incident light, a display system for magnifying and projecting an image formed on the liquid crystal display panel, and a display system for displaying a reproduced image of a video camera or the like.

2. Description of the Prior Art

A display device employing a liquid crystal display panel has been studied and developed widely because of its compact size and its light weight. Recently, pocket television sets employing a twisted nematic (TN) mode liquid crystal display panel have been used practically. Furthermore, image projection type television systems, viewfinders, and the like using the liquid crystal display panel have also been used practically.

A TN mode liquid crystal display panel has disadvantages such as low display brightness and a short use time of a battery power source due to high dissipation power needed for the light source and due to the necessity of the two polarization plates.

A liquid display panel using a polymer liquid crystal instead of a twisted nematic liquid crystal and an image projection type television system using the liquid crystal panel are disclosed in Japanese Laid Open Patent Publication No. 98,022/1991. The prior art uses a liquid crystal in which the anisotropy $\Delta n$ of the refractive index is 0.18 or more. However, such a liquid crystal has poor stability with respect to heat and light and a poor voltage retention rate. Thus, it cannot be used practically. The average diameter of the droplets of liquid crystal is stated to be controlled by the wavelength of the main component such as green of the incident light. However, it is not disclosed that the diameter is changed for each pixel, and a good contrast cannot be attained for an incident light of wide wavelength band.

U.S. Pat. No. 4,613,207 discloses that a polymer dispersed liquid crystal panel is used for a projection type television system. However, a high contrast cannot be realized similarly to the above-mentioned prior art, and uses as a viewfinder and the like are not disclosed.

SUMMARY OF THE INVENTION

It is an object of the present invention is to provide a liquid crystal display device capable of displaying an image with high luminance and high contrast.

It is another object of the present invention to provide an image projection type television system using the liquid crystal display device as a light valve, and a viewfinder using the liquid crystal display device.

In a liquid crystal display panel of the present invention, a liquid crystal/polymer composite layer is disposed between a substrate with pixel electrodes and another substrate with counterelectrodes. The composite in the layer consists of a resin component and a liquid crystal component, and the liquid crystal component exists, for example, as droplets. No polarizing plates are needed for modulating the light in contrast to the twisted nematic type liquid crystal display.

In one aspect of the invention, the liquid crystal/polymer composite layer consists of first regions and second regions, and the average of the pore sizes of liquid crystal in the first regions on the pixel electrodes is larger than that of the second regions on the switching elements. By keeping the second region always in the scattering mode, the quality of the image can be improved.

In a second aspect of the invention, a mosaic color filter of red, green and blue is provided above counterelectrodes or pixel electrodes and the liquid crystal/polymer composite layer consists of a plurality of regions, and the average of the pore sizes of the liquid crystal are different among the regions. The average of the pore sizes of the regions is optimized in each region according to the wavelength of the incident light of red, green and blue on each region. Thus, the scattering performance of the liquid crystal layer can be improved for the three colors of red, green and blue.

In a third aspect of the invention, the polymer liquid crystal/polymer composite layer consists of a plurality of kinds of regions in the same pixel, and the average of the pore sizes of the liquid crystal in the regions are changed from each other. The optimum wavelength for the scattering of light differs among the regions, and the scattering performance of the liquid crystal layer as a whole can be improved for a light of a wide band (white light).

An LCD image projection type television system of the present invention includes the liquid crystal display panels arranged in the light paths of the red, blue, and green components. The lights modulated by the liquid crystal display panels are projected on a screen to achieve an enlarged color image display.

In a viewfinder of the present invention, a light beam is incident on the liquid crystal display panel of the present invention serving as the light modulation means. The display panel modulates the incident light according to a video signal to display a display image. The display image can be viewed through magnification by means of a magnifying lens interposed between the eyes of an observer and the display panel.

An advantage of the present invention is that a liquid crystal display panel can display an image with a high luminance and a high contrast.

Another advantage of the present invention is that the scattering performance of a liquid crystal display layer can be optimized over a wide wavelength range.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
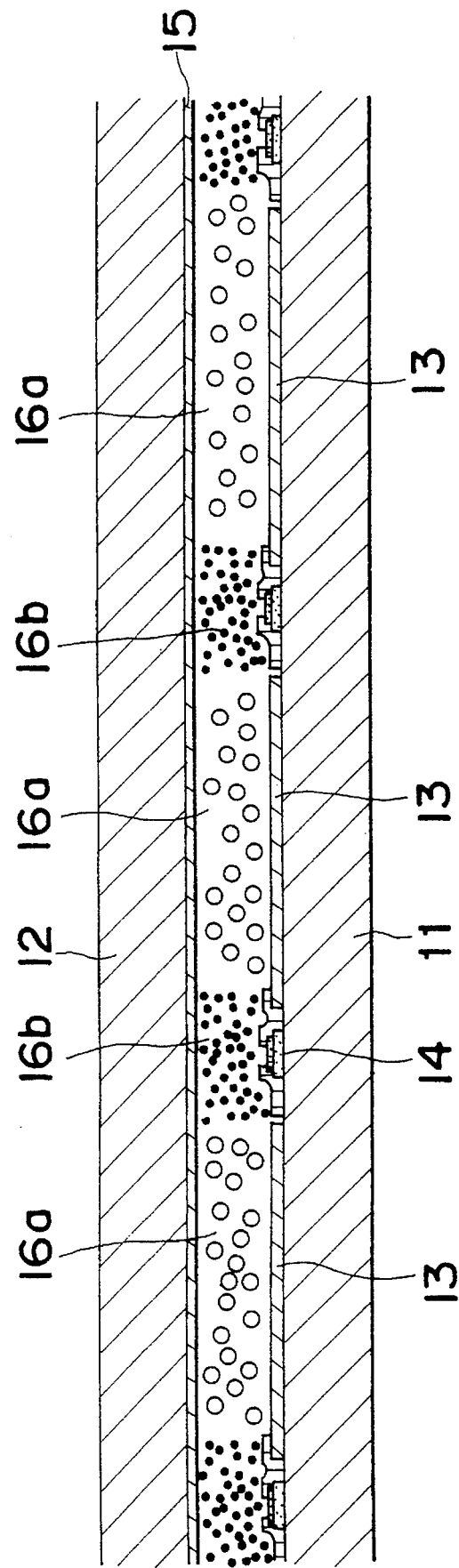
FIG. 1 is a schematic sectional view of a liquid crystal panel in accordance with a first embodiment of the present invention.

Referring now to the drawings, wherein like reference characters designate like or corresponding parts throughout the several views, FIG. 1 shows a liquid crystal panel wherein the reference numeral 11 denotes an array substrate which including pixel electrodes 13 of indium tin oxide and thin film transistors (TFT) 14. A counter electrode substrate 12 includes counter electrodes 15. A polymer dispersed liquid crystal 16 (16a and 16b) is held between the pixel electrodes 13 and the counterelectrodes 15. The polymer dispersed liquid crystal 16 consists of a resin component and a liquid crystal component, and the liquid crystal component exists, for example, as droplets. No polarizing plates are needed for modulating the light in contrast to the twisted nematic type liquid crystal display. The dispersion polymer liquid crystal 16 consists of first regions 16a above the pixel electrodes 13 and second regions 16b above the thin film transistors 14, and the average pore sizes of the liquid crystal in the first regions 16a is different from that of the second regions 16b, as will be explained below.

Figure 2:
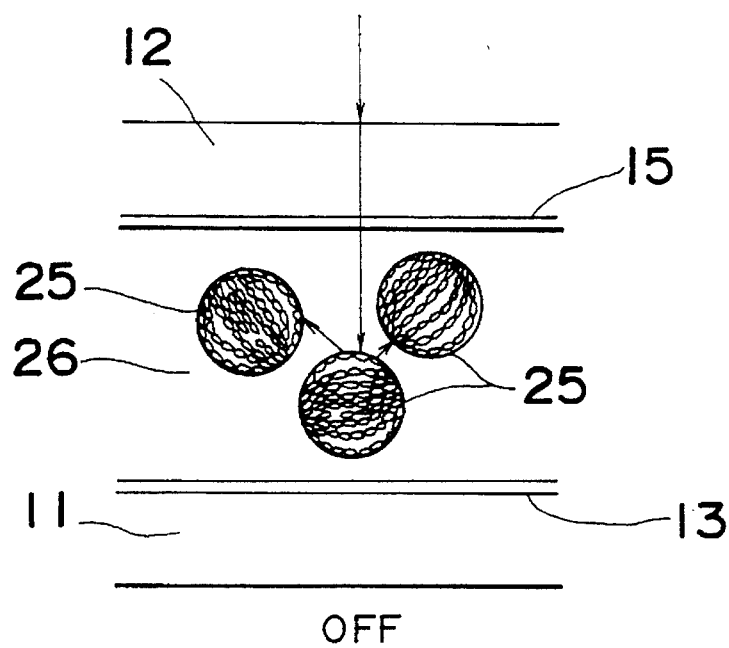
FIGS. 2(a) and (b) are diagrams for explaining the structure and the operation of a polymer dispersed liquid crystal.
Figure 2:
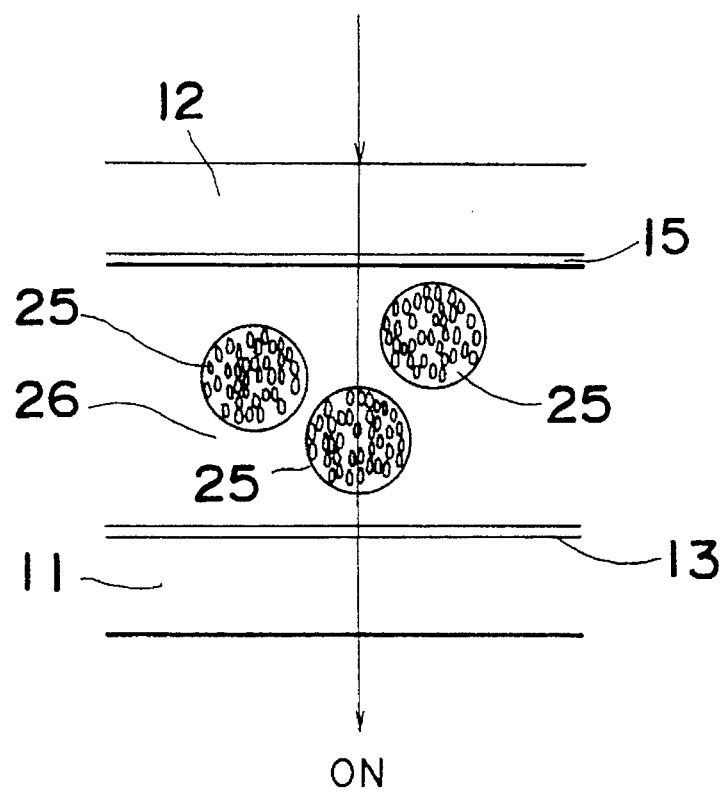
Figure 3:
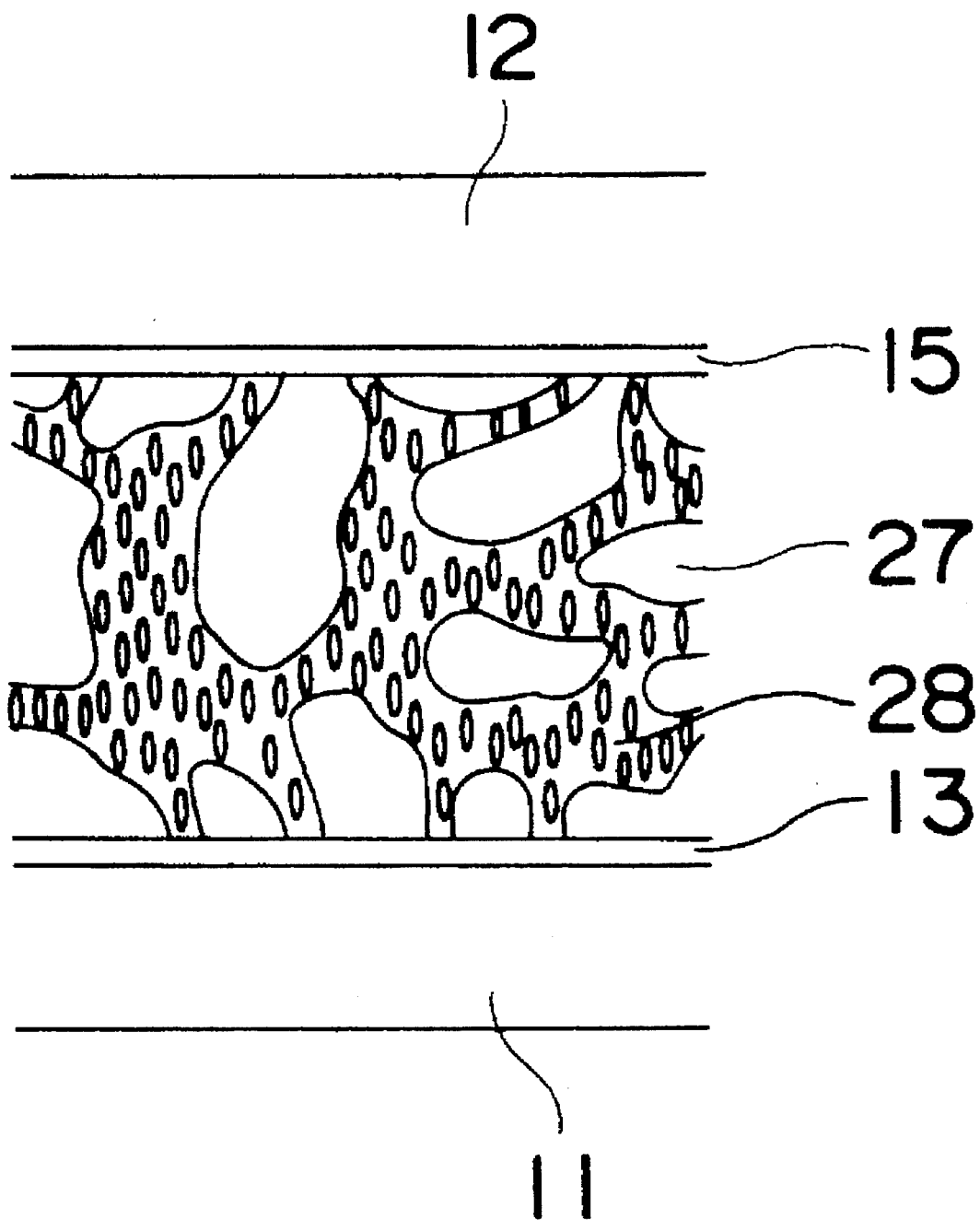
FIG. 3 is a diagram of a a structure of polymer network liquid crystal.

The polymer dispersed liquid crystal 16 used in the present invention is a composite of a liquid crystal component and a resin component, and the liquid crystal component extends in the matrix made of the resin (polymer) component. The structure of the liquid crystal/polymer composite changes according to the ratio of the liquid crystal component to the resin component, and it is classified typically into two types according to the ratio of the liquid crystal component to the polymer (resin) component. In one type of the composite having a small ratio of the liquid crystal component, droplets of liquid crystal are dispersed in the voids of the resin layer, and the liquid crystal exists discontinuously. FIGS. 2(a) and 2(b) show schematically an example wherein droplets 25 of liquid crystal are dispersed in the resin 26. This type is called a polymer dispersed liquid crystal. If the amount of the liquid crystal component is increased, droplets contact each other to form a continuous phase. In the other type having a large ratio of the liquid crystal component, a network of the resin component is formed and the liquid crystal exists not as droplets, but extends in the network continuously. This structure is analogous to a sponge impregnated with a liquid crystal. FIG. 3 shows schematically an example wherein the resin component 27 forms a network while the liquid crystal component 28 extends through the network. This type is called a polymer network liquid crystal. In the preparation of the polymer dispersed liquid crystal 16, independent particlelike droplets of liquid crystals are formed in a resin layer when the amount of the liquid crystal component is smaller than that of the polymer (resin) component. On the other hand, when the amount of liquid crystal component is larger than that of the resin component, a resin matrix or network is formed in the liquid crystal material as a continuous layer. The above-mentioned two types of liquid crystal/polymer composite can be used to display an image by controlling the scattering and transmission of light.

A display panel using the polymer dispersed liquid crystal uses a property that the refractive index of the liquid crystal varies with the orientation direction of the liquid crystal molecules. Without applying a voltage to the liquid crystal, the liquid crystal molecules in droplets align in irregular directions. In this state, a difference in refractive index exists between the liquid crystals and the resin to scatter the incident light. By applying a voltage to the liquid crystal, the liquid crystal molecules are aligned in one direction. If the refractive index of the liquid crystals oriented in the direction is controlled preliminarily to coincide with that of the resin component, the incident light is not scattered in the liquid crystal, but is transmitted through the liquid crystal component.

In contrast, the polymer network liquid crystal uses the irregularity itself of the orientation of the liquid crystal molecules for scattering the light. In the irregular orientation state, or without applying a voltage to the liquid crystal, the incident light is scattered through the liquid crystal, while when the molecules align in one direction by applying a voltage to the liquid crystal, the light is transmitted through the liquid crystal.

Although the polymer dispersed liquid crystal panel is taken mainly as examples in the following embodiments for simplicity, either of the display panels using a polymer dispersed liquid crystal or a polymer network liquid crystal can be used in the present invention. It is noted here that "polymer dispersed liquid crystal" is used hereinafter to refer generally to both polymer dispersed liquid crystal and polymer network liquid crystal, and "polymer dispersed liquid crystal display panel" is used to refer generally to display panels using either the polymer dispersed liquid crystal or the polymer network liquid crystal.

The polymer dispersed liquid crystal display panel uses an electro-optic effect as explained briefly below with reference to FIGS. 2(a) and (b). Reference numeral 25 denotes droplets of liquid crystal, while reference numeral 26 denotes a resin. A thin film transistor (TFT) (not shown) 14 and other circuit components are connected to a pixel electrode 13 on a array substrate 11, and the TFT 14 is turned on and off according to the voltage applied to the pixel electrode 13. The orientation direction of the molecules in the droplets 25 dispersed in the resin 26 varies with the voltage applied between the pixel electrode 13 and the counterelectrode 15 thereby to modulate incident light.

FIG. 2(a) shows schematically a scattering state where no voltage is applied (off condition), and the liquid crystal molecules in the droplets orient in random directions. In this case, a difference in the refractive index exists between the resin 26 and the liquid crystal 25 to scatter the incident light. As shown in FIG. 2(b), when a voltage is applied to the pixel electrode 13, the molecules are aligned in one direction. By controlling preliminarily the refractive index of the liquid crystal oriented in the direction to coincide with that of the resin, the incident light is not scattered in the liquid crystal 25, but transmits outward through the array substrate 11. It is noted here that a common voltage is applied to the counterelectrode 15.

The above-mentioned polymer dispersed liquid crystal does not need a polarizer and an analyzer for modulating the light. Therefore, it can display at twice the luminance or more when compared with a display panel using a twisted nematic liquid crystal.

As explained above, in the polymer dispersed liquid crystal display panel, an image is displayed by controlling the scattering and the transmission of incident light. Usually, when a voltage is applied to the liquid crystal, the light is transmitted (transmission mode), while when no voltage is applied, it is not transmitted (scattering mode). In order to obtain a display image of a high quality with a high contrast, it is desirable to increase the scattering performance which is defined as a ratio of the quantity of light observed by the observer in the scattering and transmission modes.

In the polymer dispersed liquid crystals as shown in FIGS. 2(a) and 2(b), the average size of the liquid crystal phase can be defined as the average of the diameters of the droplets of liquid crystal or of the micropores in the resin component. On the other hand, in the polymer network liquid crystal as shown in FIG. 3, the average size of liquid crystal phase can be defined as the average of the size of the pores of the channels formed in the network of the resin phase. The average diameter of the droplets of liquid crystal and the pore size of the resin network are called hereinafter the average pore size.

The average pore size has a close relationship with the scattering performance of light by the liquid crystal panel. If a monochromatic light or a light of a narrow bandwidth is used for display, the average pore size is preferably optimized according to the wavelength of the light. On the contrary, if a region in the liquid crystal layer is not desired to transmit the light, the pore size in the region can be controlled so as not to transmit the light.

If the average pore size is large, the drive voltage for the transmission mode is low, while if the average pore size is small, the drive voltage for the transmission mode is large.

It is preferable for improving the incident light scattering capability and for increasing the contrast that the average pore size be fairly uniform. It is also preferable for good incident light scattering capability that the average pore size is within the range of 0.5 to a few micrometers. More preferably, the average pore size is in the range of 0.8 to 3.0 μm, or more particularly in the range of 1.0 to 2.0 μm. In order to achieve the above-mentioned condition, the material for the resin must be a material which can be set in a short time, such as an ultraviolet-setting resin. The mixture ratio of the liquid crystal material to the resin material is preferably in the range of 30:70 to 90:10, and more preferably in the range of 50:50 to 90:10.

It is preferable that the average pore size in the polymer dispersed liquid crystal is in a range between 1.0 and 2.0 μm, as mentioned above. The scattering by the polymer dispersed liquid crystal has a relatively large dependence on the wavelength of the incident light. Then, in order to optimize the scattering for the incident light, the average pore size has to be adjusted according to the wavelength of the incident light. If the incident light which transmits the liquid crystal has a short wavelength such as blue, the average pore size is preferably 1.5 μm or less for the display contrast. On the contrary, if the incident light which transmits the liquid crystal has a long wavelength such as red, the average pore size is preferably 1.5 μm or more.

It has to be noted that the polymer dispersed liquid crystal 16 shown in FIG. 1 has a characteristic that it is composed of two regions 16a and 16b which have different average pore sizes. As to the regions 16a on the pixel electrodes 13, the average pore size is chosen preferably in a range between 1.0 and 2.0 μm. On the contrary, the regions 16b above the TFTs 14 and the signal lines such as gate and source lines (not shown) for supplying signals to the TFTs 14 have an average pore size of 0.6 μm (about the wavelength of the incident light) or less, preferably of 0.5 μm or less so as not to transmit the incident light. Signals are constantly applied to the signal lines, so that the liquid crystals above the signal lines are always subjected to an electric field to affect the alignment of liquid crystal molecules. Then, if the orientation of the liquid crystal molecules changes according to the electric field, an image may be projected according to the change of the orientation state. Therefore, the average pore size in the polymer dispersed liquid crystal 16b is chosen to be small in order to suppress the change in the alignment state.

Preferably, the liquid crystal for the display panel is a nematic liquid crystal, a smectic liquid crystal, or a cholesteric liquid crystal. The liquid crystal may consist of a single compound or a mixture of two or more liquid crystals, or a mixture further including a substance other than liquid crystal compounds. Among the above-mentioned liquid crystal materials, cyanobiphenyl group nematic liquid crystals or fluorine group nematic liquid crystals are preferable because they have a large difference Δn of refractive index, while the fluorine group nematic liquid crystals having a smaller Δn are also preferable due to the stability with respect to light and the like, a high charge conservation rate of 90% or more and a high heat resistance. With the above-mentioned material, an advantageous liquid crystal layer capable of having an electric charge retention of not less than 90% and a good heat resistivity can be produced. In this embodiment, a fluorine group nematic liquid crystal is used for the liquid crystal panel. Because a fluorine group nematic liquid crystal has a small difference Δn of refractive index, the light is not greatly scattered. Because it has a low dielectric constant, the thickness of the liquid crystal layer is selected to be thick enough to assist the scattering property.

Preferably, the resin material 26 is a transparent resin, and any one of a thermoplastic resin, a thermosetting resin, and a photo-setting resin may be selected. An ultraviolet-setting resin such as an ultraviolet-setting acrylic resin is preferable because it can be easily produced and well separated from the liquid crystal. Particularly, a resin is preferable which contains acrylic monomers or acrylic oligomers which can be polymerized and hardened by ultraviolet ray irradiation. When a mixture of such monomers with a liquid crystal material is irradiated with ultraviolet rays, only the resin material reacts to form a polymer (resin), and the liquid crystal phase is separated from the resin phase.

A monomer for the resin phase may be 2-ethylhexyl acrylate, 2-hydroxyethyl acrylate, neopentyl glycol diacrylate, hexanediol diacrylate, diethylene glycol diacrylate, tripropylene glycol diacrylate, polyethylene glycol diacrylate, trimethylol propane triacrylate, pentaerythritol acrylate or the like. An oligomer or prepolymer for the resin phase may be polyester acrylate, epoxy acrylate, polyurethane acrylate or the like.

In order to enhance the polymerization rate, a polymerization initiator may be used such as a 2-hydroxy-2-methyl-1-phenylpropane-1-on ("DAROCURE 1173" available from Merk & Co.), 1-(4-isopropylphenyl)-2-hydroxy-2-methyl-propane-1-on ("DAROCURE 1116" available from Merk & Co.), 1-hydroxy cyclohexyl phenylketone ("Irgacure 651" available from Ciba-Geigy AG) or the like. Furthermore, a chain transfer agent, a photosensitizer, a dye agent, a crosslinking agent or the like may be appropriately incorporated as an additional ingredient.

The thickness of the liquid crystal thin film 37 is preferably in a range of 10 to 30 μm, and more preferably 12 to 20 μm. The thickness is determined in relation to a drive voltage therefor. When the film thickness is 20 μm or more, the incident light is scattered completely (this state is referred to as the "complete scattering state") to realize a high contrast. However, a drive voltage of 10 V or more is required. The drive voltage greatly depends on the mixture ratio of the liquid crystal and the resin, the materials thereof, and the like. -The drive voltage for transmittance of 90% was about 7 V when a fluorine group liquid crystal is used, the mixture ratio is 80:20 and the liquid crystal film thickness of 15 μm. Because the limit of the output voltage of the drive IC, the maximum of the drive voltage has to be taken as about 7 V. Therefore, the film thickness of liquid crystal is preferably around 15 μm.

It is preferable that shading films (not shown) each made of a metallic thin film insulated via an insulator film is formed on the TFTs 14 in order to prevent the optical excitation due to the incident light. The shading film may be made from a black insulator or amorphous silicon. The thick amorphous film may reduce the transmission to 20–30%, and it is good as a simple shading film. The shading films are not needed for example when the semiconductor layer is made from polysilicon or the like.

In a prior art twisted nematic liquid crystal panel, the shading films are provided on the counterelectrodes. However, this affects the precision of the adhesion of the counterelectrode substrate and the array substrate, and if the precision is low, the shading films have to be made thick and this decreases the aperture ratio. Further, if the shading films are provided in the panel shown in FIG. 1, the light is scattered in the polymer dispersed liquid crystal 16, the scattered light will irradiate the TFTs 14. Then, in the present embodiment, the shading films are formed directly on the TFTs 14 to prevent the incident light on the semiconductor layers in the TFTs 14.

Next, a manufacturing method of the liquid crystal panel shown in FIG. 1 is explained. First, beads (not shown) for obtaining a predetermined liquid crystal film thickness are scattered on the counterelectrode substrate 12. On the other hand, a resin for sealing is applied on the array substrate 11. Then, the two substrates 11 and 12 substrates are adhered to each other. Then, a liquid crystal solution is filled between them with a vacuum fill method or with a pressure fill method. In the vacuum fill method, the adhered substrates is evacuated to make the space between the substrate in a vacuum state and is immersed in a liquid crystal solution which is a mixture of a liquid crystal and monomers of a resin before polymerization. Then, the inlet to the space is opened to fill the liquid crystal solution. In the pressure fill method, a liquid crystal solution is filled through the inlet to the space between the two substrate under pressure. In a further method, after a liquid crystal solution is dropped on the two substrates, they are adhered to each other.

After the liquid crystal solution is filled between the substrates, ultra-violet rays of narrow directivity irradiate first in the direction A, as displayed in FIG. 1. The liquid crystal solution located above TFTs 14 remain not to be polymerized. The intensity of the ultra-violet rays depends on the spectra of the ultra-violet rays, the liquid crystal solution, the panel structure, the temperature and the like. For example, ultra-violet rays irradiates the liquid crystal solution at an intensity of 20–30 mW/cm$^2$ for two to eight seconds. If the peak wavelength of the light to be modulated by the liquid crystal panel is short, an intensity near 20 mW/cm$^2$ is adopted, while if the peak wavelength of the light is short, an intensity near 20 mW/cm$^2$ is selected. The temperature which is an important factor has to be controlled appropriately.

Next, the ultra-violet rays irradiate the liquid crystal solution in the opposite direction B, for example at an intensity of 30 mW/cm$^2$ or more for two to eight seconds. If ultra-violet rays of such a strong intensity per unit area irradiate the liquid crystal solution, the average pore size in the regions 16b above the TFTs and the signal lines of the polymer dispersed liquid crystal becomes small. Then, the liquid crystal in the regions 16b does not respond for a usual drive voltage of several volts or the alignment of the liquid crystal changes little. Then, the liquid crystal is always in the scattering mode even if image signals are applied to the signal lines. When the liquid crystal panel is used for a image projection type television system, the regions 16b are always kept black, without using shading films on the TFTs and the signal lines.

The liquid crystal panel manufactured as mentioned above has a disadvantage in that liquid crystal molecules may align in regions between the pixel electrodes 13 and the TFTs 14 according to the image signals and may leak the light eventually. In order to solve this problem, it is necessary to make the average pore size in the regions between the pixel electrodes 13 and the TFTs 14 small.

Figure 4:
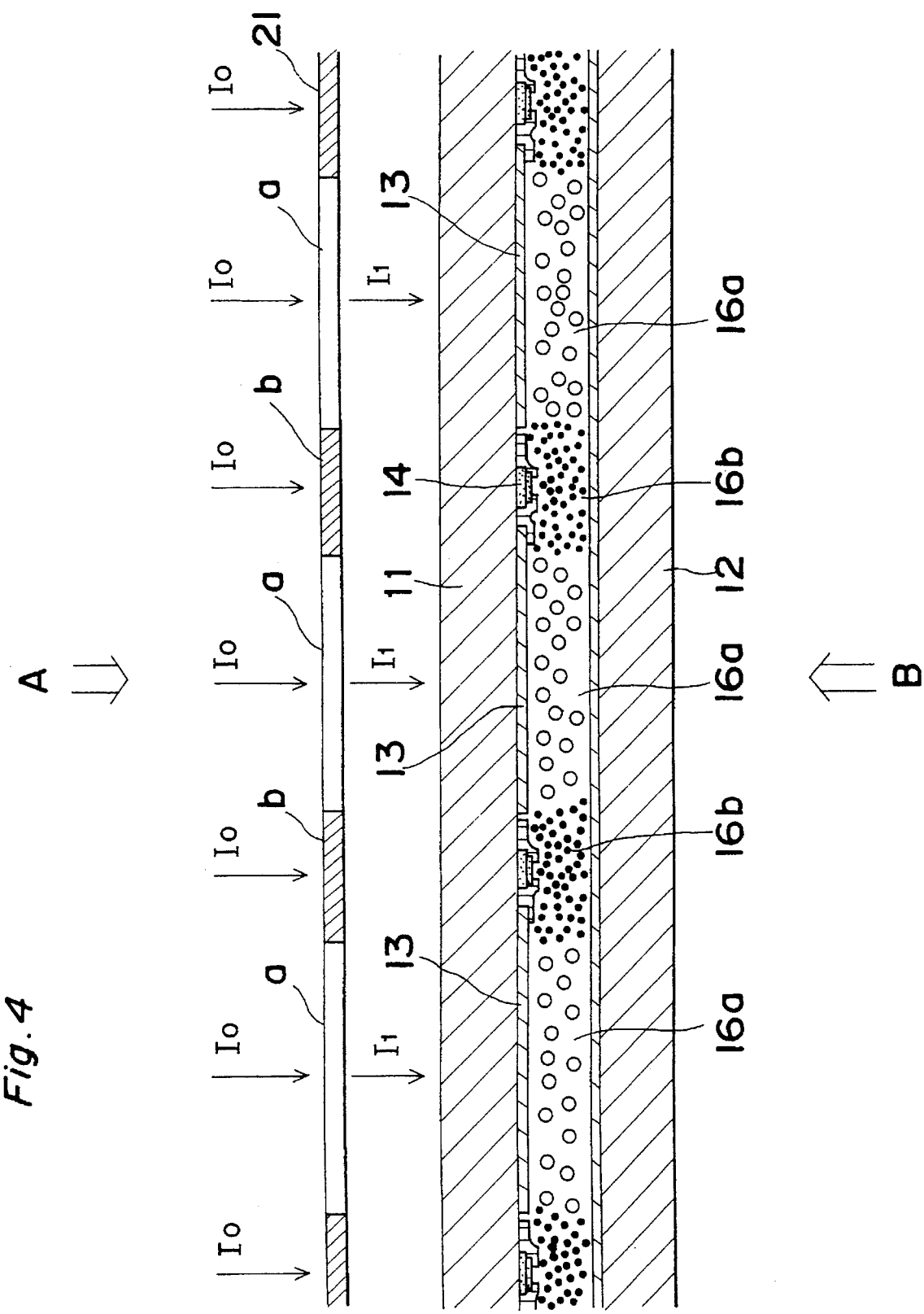
FIG. 4 is a schematic sectional view of a liquid crystal panel for illustrating a manufacturing method of the liquid crystal panel.

FIG. 4 shows a manufacturing method for solving the problem which used a glass mask 21 provided above the substrate 11. The glass mask 21 has shading films "b". The shading films "b" are formed for shading the incident light in correspondence to the arrangement of the TFTs. The area of each shading film is larger than the size of the TFT and thicker than the width of the signal lines.

After the liquid crystal solution is filled between the substrates 11 and 12, the glass mask 21 is provided above the array substrate 11, and ultra-violet rays irradiate the liquid crystal solution first in the direction A, as displayed in FIG. 4. The liquid crystal solution in the irradiated regions polymerizes to separate the liquid crystal phase from the resin phase, whereas that above the TFTs 14 remains not to be polymerized. If the glass mask 21 is contacted closely to the array substrate 11, the directivity of the irradiating ultra-violet rays has to be sharpened. On the other hand, if the glass mask 21 is separated from the array substrate 11, a lens for focusing the incident light is arranged between the mask 21 and the panel to focus the pattern of the mask 21 on the panel plane. The regions "a" in the mask 21 transmits the incident light of intensity $I_0$ without substantial attenuation at an intensity $I_1$ to irradiate the pixel electrodes 13. Then, the irradiated liquid crystal solution polymerize and the liquid crystal component and the resin component are separated from each other. On the other hand, the incident light is reflected or absorbed in the regions "b" so as not to irradiate the array substrate 11 or for the liquid crystal solution in the non-irradiated regions to remain not polymerized.

Next, the glass mask 21 is removed, and ultra-violet rays irradiate the liquid crystal solution in the direction B displayed in FIG. 4 to polymerize the liquid crystal solution in the no-irradiated regions. At this time, as mentioned in the first embodiment, the ultra-violet rays irradiate the liquid crystal solution, for example at an intensity of 30 mW/cm$^2$ or more to decrease the average pore size in the periphery area of the pixel electrodes 13 to a very small value. Then, the liquid crystal is always aligned around the periphery of pixels, and it is difficult for the light to leak to the periphery of the pixels.

As illustrated above, shading films are not formed on the TFTs 14 and on the signal lines in the liquid crystal panel, and this is more advantageous for a reflection type liquid crystal panel wherein pixel electrodes are made not of indium tin oxide, but of a metal such as aluminum. Previously, shading films were usually made from chromium of a 60% reflectivity on counterelectrodes in a reflection type liquid crystal display panel. In such a liquid crystal display panel, the incident light to be modulated is irradiated in the direction "B", and 40% of the incident light is always reflected to project an unnecessary reflection irrespective of the image signals on a screen. This unnecessary reflection lowers the contrast of an image.

On the contrary, though shading films are not formed on the counterelectrode substrate 15 in the present embodiment, liquid crystals above the TFTs always scatter the light to play a role of an effective shading film because the average pore size is small. On the other hand, shading films are formed above TFTs 14 to prevent the incidence on the semiconductor layer of TFT.

If the average pore size is changed according to pixels, the scattering characteristic can be improved over a wide range of wavelength for the incident light as a whole. As mentioned above, the scattering characteristic has a relationship with respect to the wavelength of the incident light, and the average pore size has to be increased with increasing wavelength. If the pore size is homogeneous in a region 16a as shown in FIG. 1, the scattering characteristic is good for a specified wavelength, but it becomes worse at the other wavelengths. Thus, a sufficient contrast cannot be realized.

Figure 5:
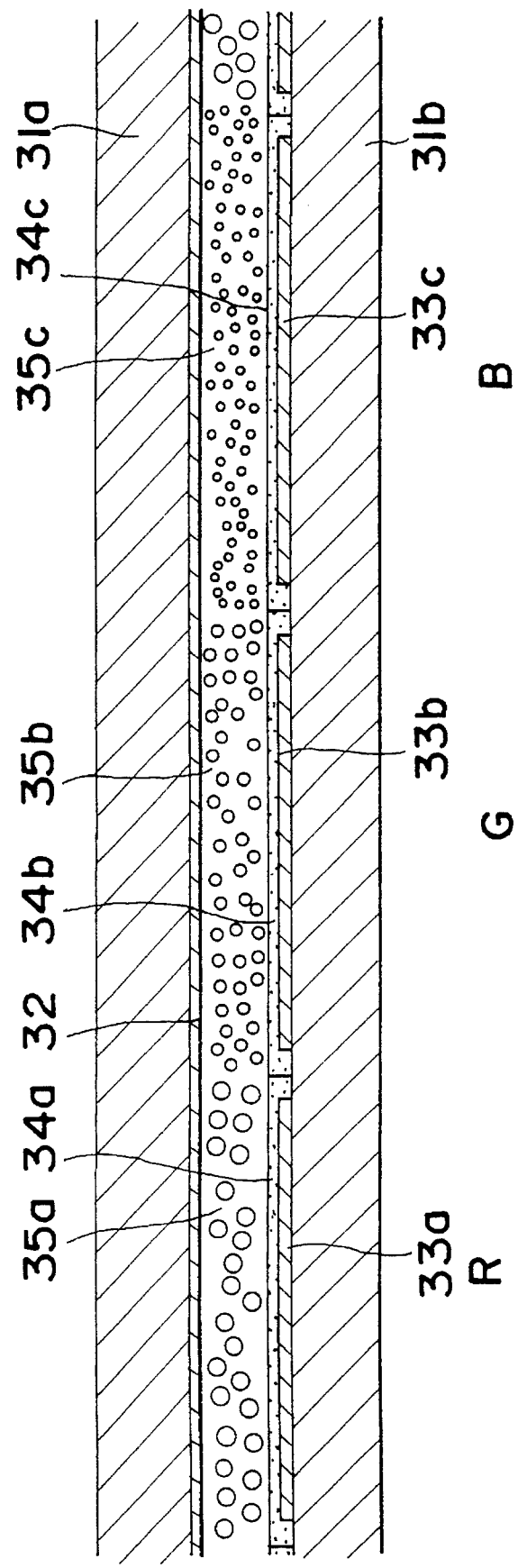
FIG. 5 is a sectional view of a liquid crystal panel in accordance with a second embodiment of the present invention.

The adjustment of the pore size is particularly effective if a mosaic (matrix) color filter of red, green and blue is provided. FIG. 5 shows an example of a simple matrix type liquid crystal panel, but it can also be applied to an active matrix type liquid crystal panel. The liquid crystal panel shown in FIG. 5 is the same as that shown in FIG. 1 except the following points. Scan electrodes in the X direction are formed on a glass substrate 31a, while scan electrodes 33a, 33b and 33c are formed in the Y direction perpendicular to the X direction on another glass substrate 31b. A mosaic color filter 34 consisting of a matrix of three portions 34a, 34b and 34c is formed on the scan electrodes 33a, 33b and 33c; the color filter 34a for red is formed on the electrode 33a, the color filter 34b for green is formed on the electrode 33b, and the color filter 34c for blue is formed on the electrode 33c. The color filter 34 may be provided between the glass substrate 31b and the electrode 33. The polymer dispersed liquid crystal layer consists of three regions: a first region 35a on the color filter 34a for red, a second region 35b on the color filter 34b for green, and a third region 35c on the color filter 34c for blue. The average pore size of the region 35a for red is the largest, and that of the region 35c for blue is the smallest.

Figure 6:
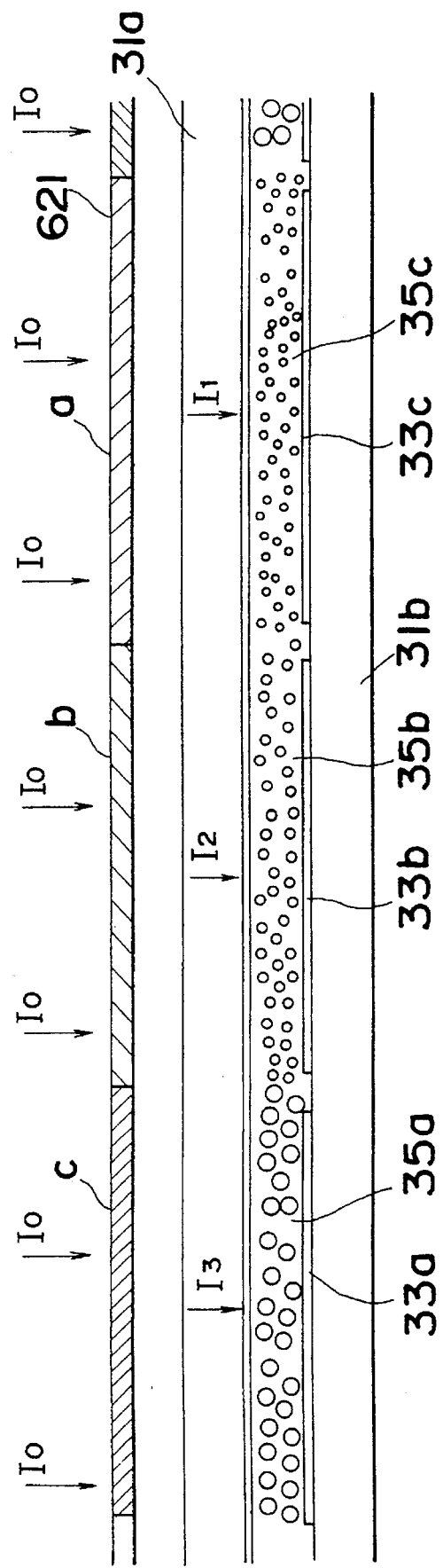
FIG. 6 is a schematic sectional view of a liquid crystal panel for illustrating a manufacturing method of the liquid crystal panel.

FIG. 6 shows a diagram for illustrating a method for manufacturing a liquid crystal panel shown in FIG. 5. A mask 621 is put on the panel. The mask 621 has first portions "a" which transmit the incident ultra-violet rays of an intensity $I_0$ with little attenuation to irradiate the panel at an intensity $I_1$, second portions "b" which transmit the incident ultra-violet rays with an attenuation of 10–30% to irradiate the panel at an intensity $I_2$, and third portions "c" which transmit the incident ultra-violet rays with an attenuation of 20–50% to irradiate the panel at an intensity $I_3$. The mask 621 having the three portions of different transmission can be prepared, for example, by depositing chromium films of different thicknesses.

Ultra-violet rays irradiate the panel through the mask 621. Similarly to the method explained above, the pattern of the mask 621 is focused with a lens on the panel. Then, the irradiation intensity of the ultra-violet rays irradiating the panel becomes different for each portion in the panel. The average pore size increases with decreasing irradiation intensity of the ultra-violet rays per time, and the scattering performance is correlated to the pore size and the wavelength.

The average pore size in the liquid crystal layers 35a, 35b and 35c is controlled to differ from each other by 0.1–0.3 μm. The intensity of the ultra-violet rays depends on the wavelength thereof, the materials and the composition of the liquid crystal solution, the panel structure, the temperature and the like, and it can be determined from experiments.

Thus, liquid crystal regions of different average pore sizes for red, green and blue can be formed in the panel. Thus, optimum scattering performance for red, green and blue of the colors of the filter can be realized.

Further, in the simple matrix type liquid crystal panel of FIG. 5, it is also preferable that the average pore size in regions between the pixels is 0.8 μm or less so as not to change the alignment of liquid crystal molecules according to the electric field. Then, cross talk and the like can be prevented and the image quality can be improved. The method explained above with reference to FIG. 4 can be used for this purpose.

Figure 7:
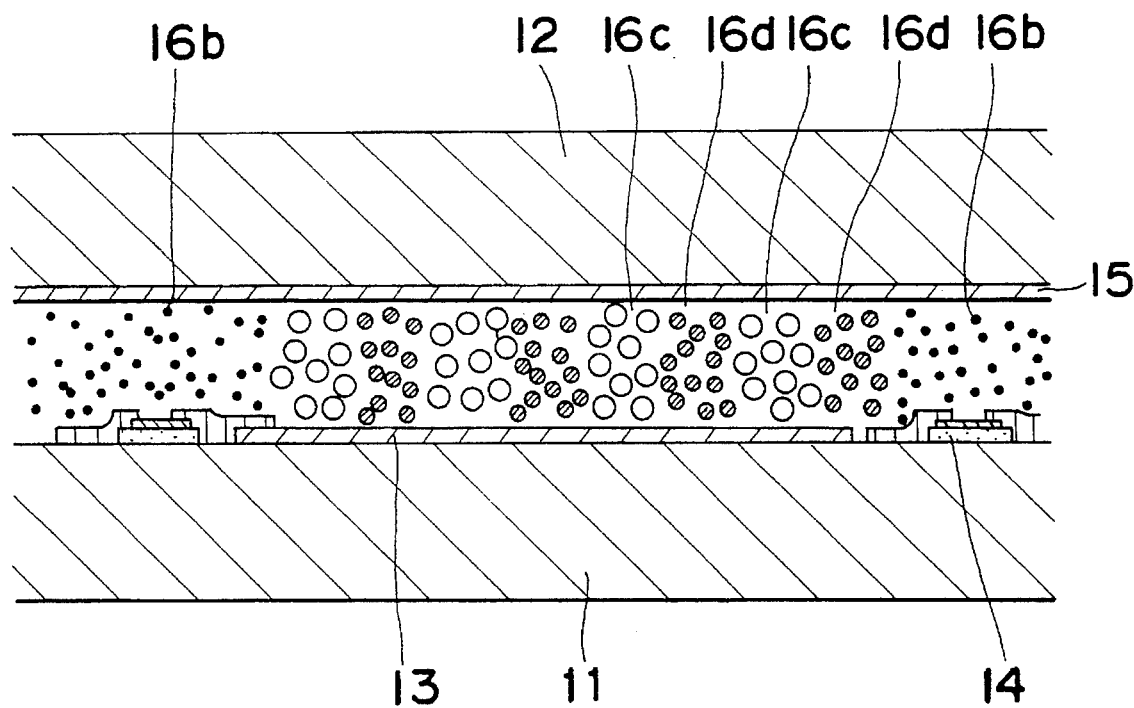
FIG. 7 is a sectional view of a liquid crystal panel in accordance with a third embodiment of the present invention.
Figure 8:
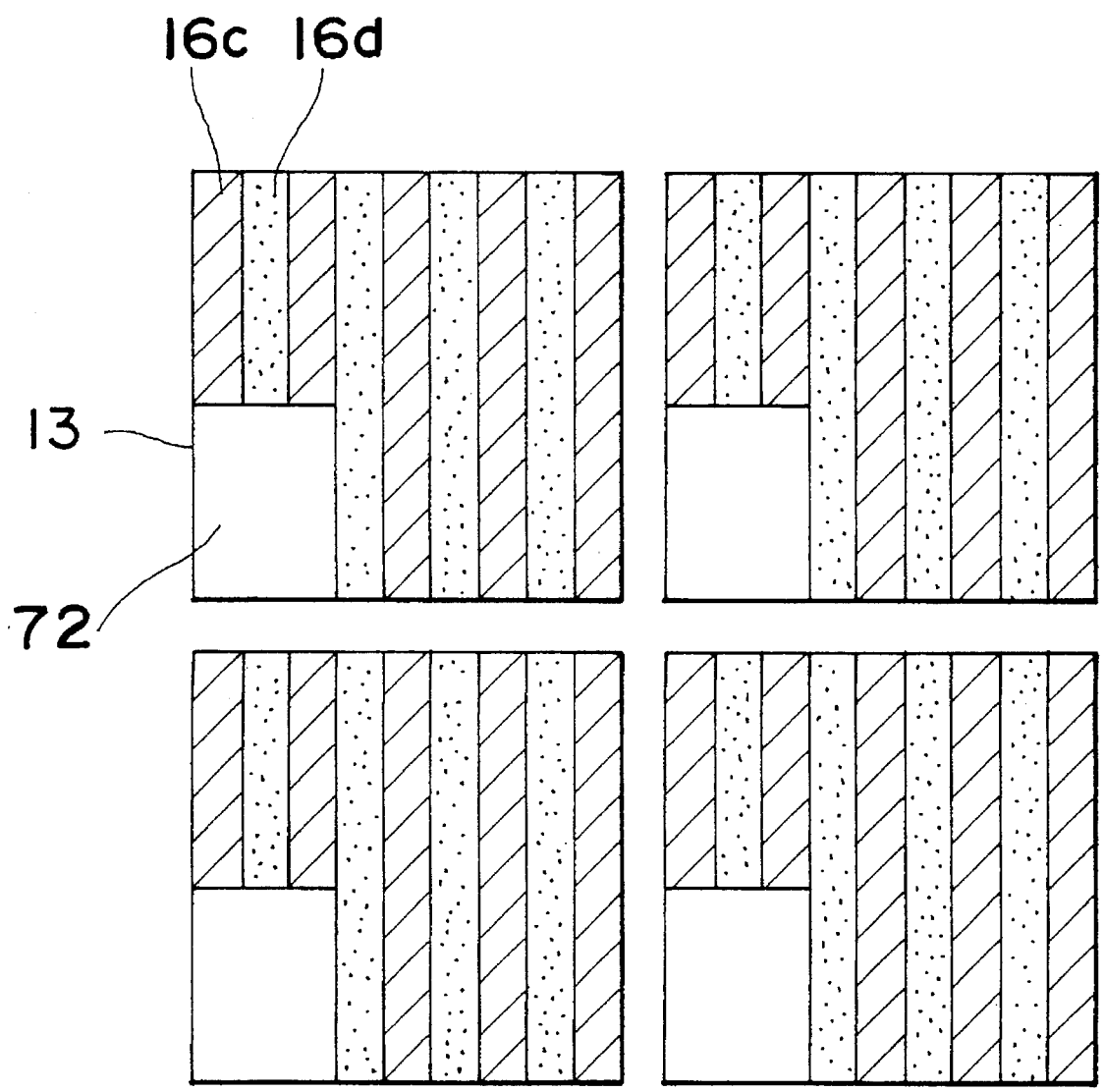
FIG. 8 is a schematic sectional view of a liquid crystal panel in accordance with a third embodiment of the present invention.
Figure 9:
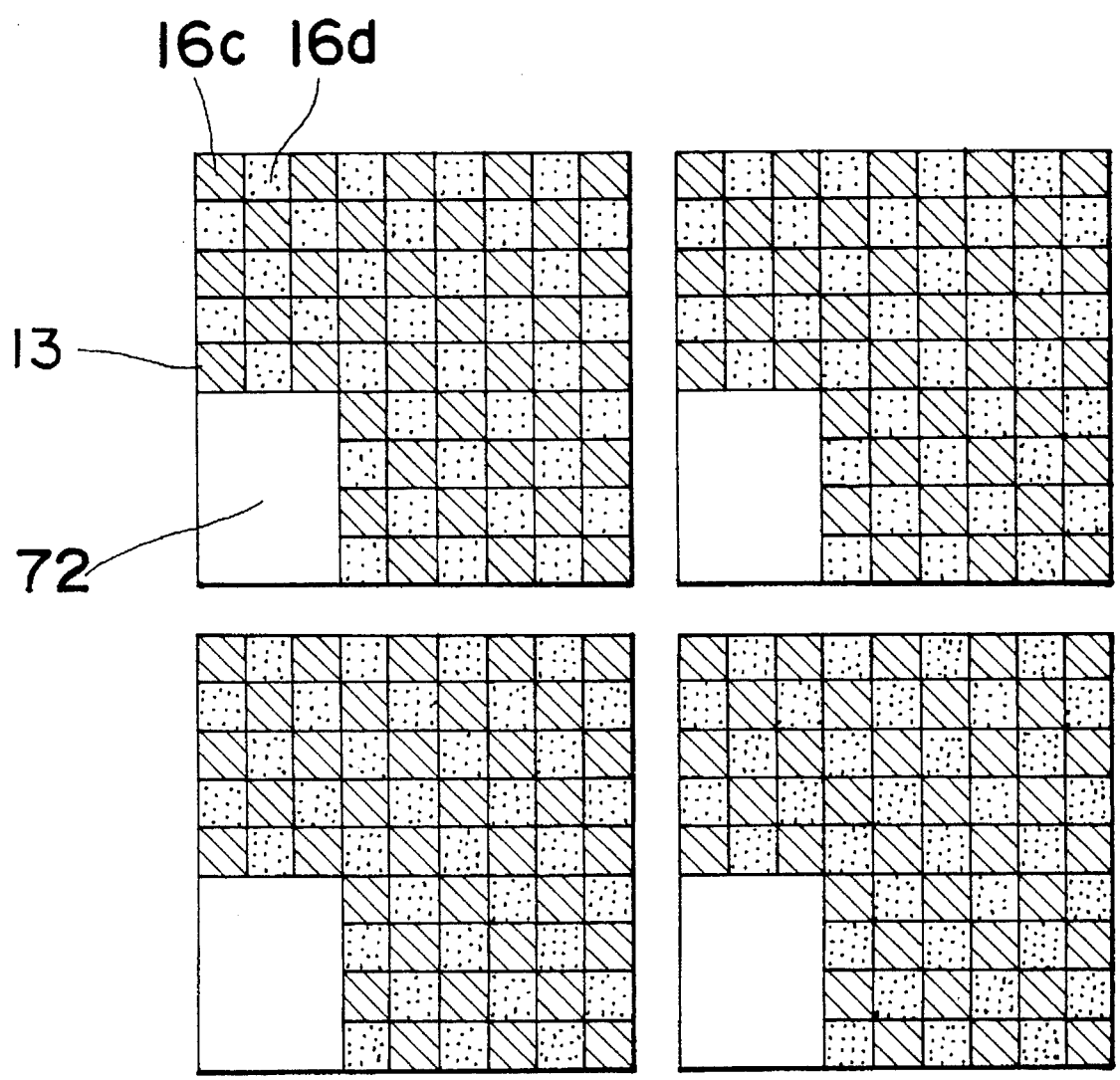
FIG. 9 is a schematic sectional view of a liquid crystal panel in accordance with a fourth embodiment of the present invention.

FIG. 7 shows a liquid crystal panel in accordance with a third embodiment of the present invention. This panel is the same as that shown in FIG. 1 except that two kinds of regions 16c and 16d are formed on the same pixel electrode 13. The two regions 16c and 16d may be arranged as stripes on a pixel 13 as shown in FIG. 8 or as a matrix on a pixel 13 as shown in FIG. 9. The reference numeral 72 in FIGS. 8 and 9 denotes a region for forming the TFT 14.

As explained above, the scattering performance is correlated to the pore size and the wavelength of the incident light. On the other hand, the wavelength of the incident light has a certain bandwidth. Then, if the average pore size is controlled so that the scattering performance is optimum at a specified wavelength, the scattering performance becomes worse at wavelengths far from the specified wavelength and this means that the contrast of the display becomes low. Then, as shown in FIG. 7, the liquid crystal panel of the third embodiment has a plurality of kinds of liquid crystal layers having different average pore size. For example, the liquid crystal layers 16c have the average pore size so that the scattering performance is optimum at 550 nm, while the liquid crystal layers 16c have the average pore size so that the scattering performance is optimum at 450 nm. Then, the liquid crystal display panel can maintain the scattering performance over a wide range of wavelength. This panel can be used favorably for a direct vision type liquid crystal panel which modulates the light over wide range (white light) from blue to red.

Figure 10:
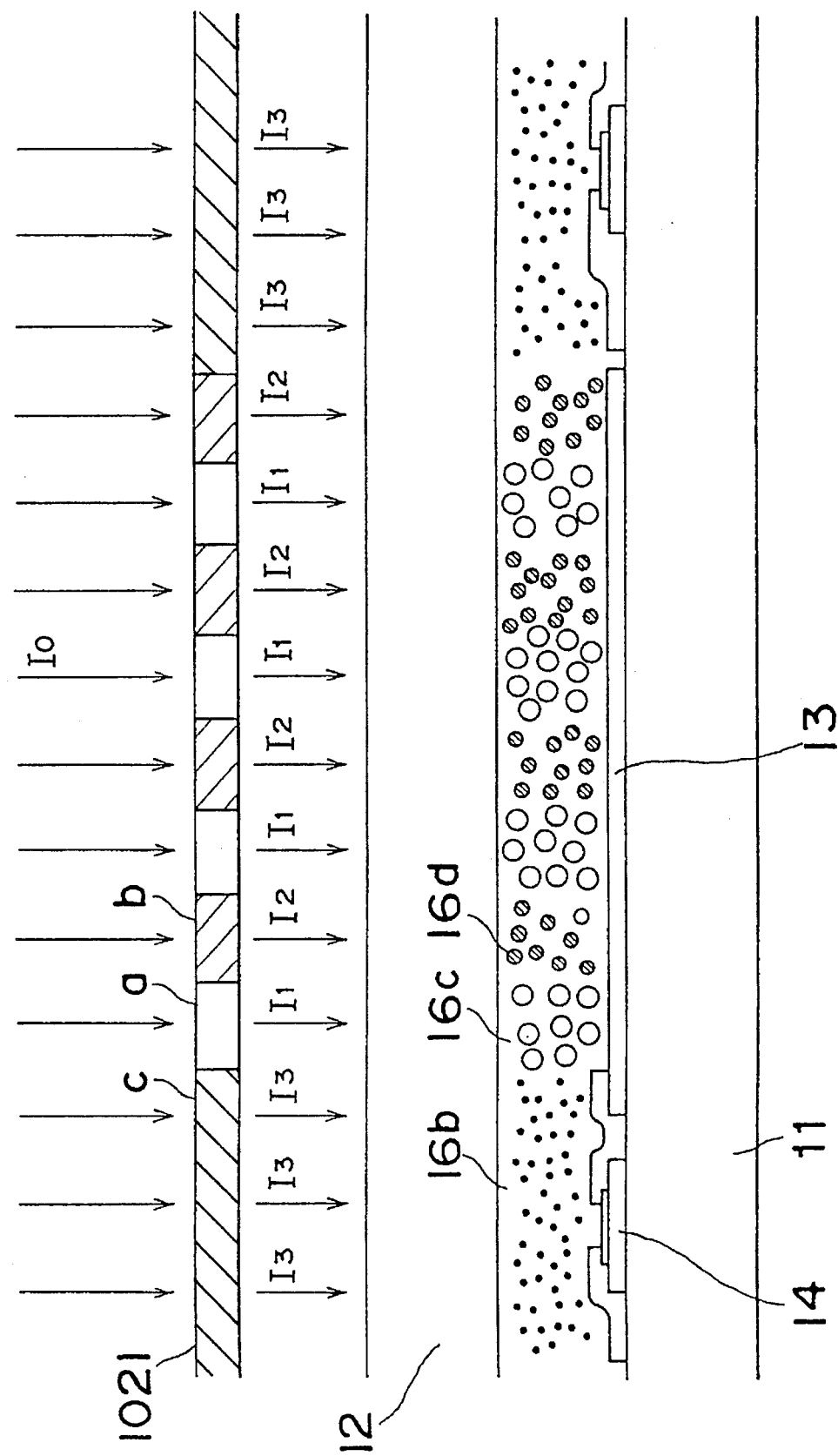
FIG. 10 is a schematic sectional view of a liquid crystal panel for illustrating a manufacturing method of the liquid crystal panel.

FIG. 10 for illustrates a method for manufacturing a liquid crystal panel as shown in FIG. 7. A mask 1021 is put on the panel. The mask 1021 has first portions "a" which transmit the ultra-violet rays of an intensity $I_0$ with little attenuation to irradiate the panel at an intensity $I_1$, second portions "b" which transmit the ultra-violet rays with attenuation of 5–30% to irradiate the panel at an intensity $I_2$, and third portions "c" which transmit the ultra-violet rays with attenuation of 10–50% to irradiate the panel at an intensity $I_3$. The mask 1021 having three portions of different transmission can be prepared for example by depositing chromium films of different thicknesses.

Ultra-violet rays irradiate the panel through the mask 1021. Similarly to the method explained above, the pattern of the mask 1021 is focused with a lens on the panel. Then, the irradiation intensity of the ultra-violet rays irradiating the panel becomes different for each portion in the panel. As explained above, the average pore size increases with decreasing irradiation intensity of the ultra-violet rays per time, and the scattering performance is correlated to the pore size and the wavelength. Then, liquid crystal layers of different average pore size can be formed in a pixel in the panel. Thus, optimum scattering performance for red, green and blue in correspondence with the colors of the filter can be realized.

Figure 11:
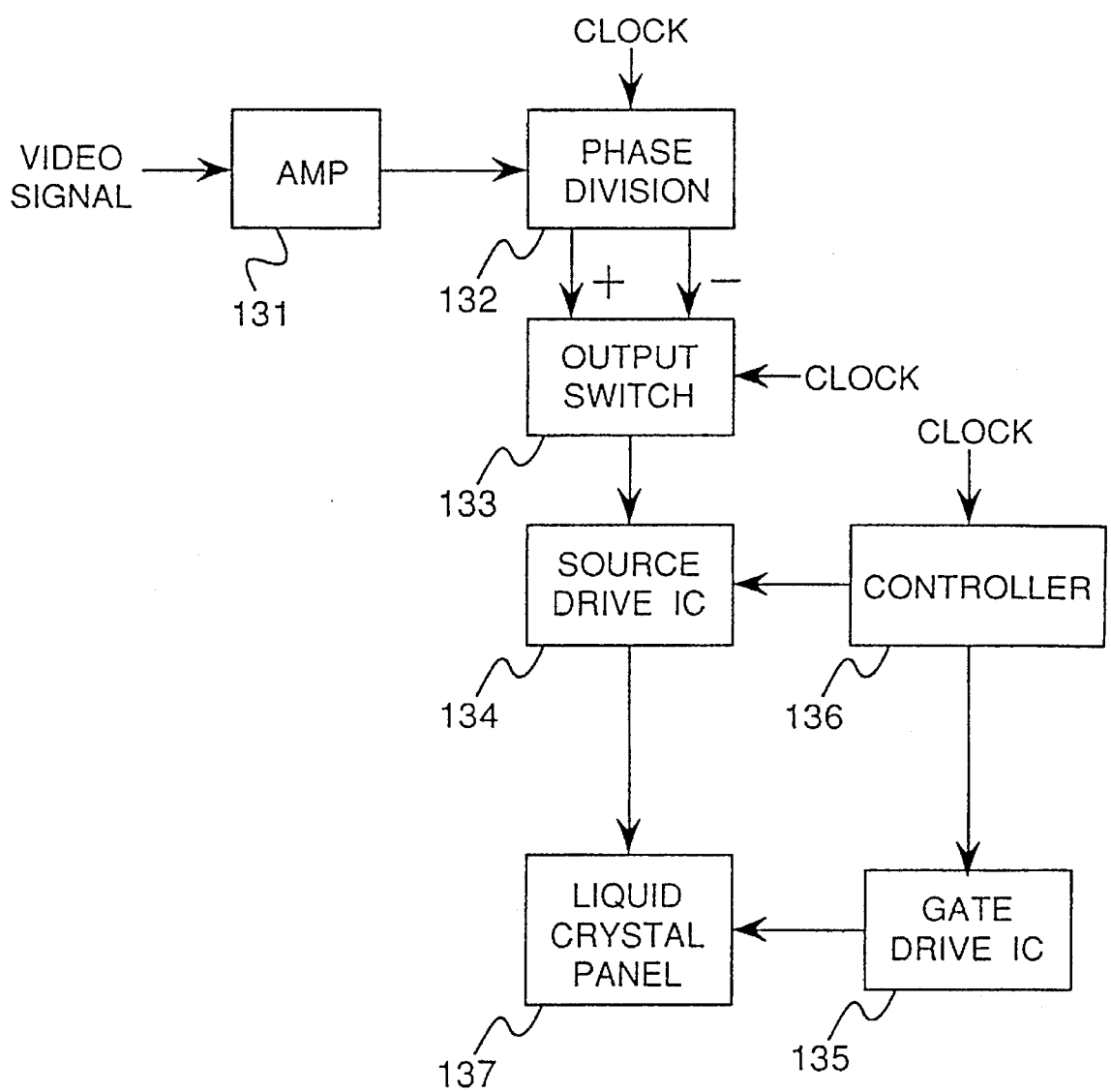
FIG. 11 is a sectional view of a display device according to the present invention.

FIG. 11 shows a block diagram of a drive circuit of liquid crystal panels of the above-mentioned embodiments. The reference numeral 131 denotes an amplifier for amplifying a video signal to a predetermined value, and the reference numeral 132 denotes a phase division circuit for generating video signals of positive and negative polarities. The positive and negative polarities mean potentials higher and lower than the potential of the counterelectrode 14 (hereinafter referred to as common voltage), respectively. The reference numeral 133 denotes an output switch circuit for providing an alternating current video signal which changes the polarity each field or horizontal scan period (1H). The reference numeral 137 denotes the liquid crystal panel of the above-mentioned embodiments, and the reference numeral 136 denotes a controller for synchronizing and controlling a source drive IC 134 and a gate drive IC 135.

In the drive circuit, the amplifier 131 controls the gain so that the amplitude of the video signal corresponds to the electro-optic effect of liquid crystal. Next, the video signal is received by the phase division circuit 132 to generate two video signals of positive and negative polarities. The two video signals are sent to the output switch circuit 133 to change the polarity of the video signal alternately each horizontal scan period in order to apply an AC voltage to the liquid crystal because the liquid crystal is decomposed and degraded under a DC voltage. Next, the video signal from the output switch circuit 133 is received by the source drive IC 134, which sends a video signal sampled in synchronism with the control signal of the drive IC control circuit 136 to the source signal line of the liquid crystal panel 137. On the other hand, the gate drive IC 135 sends a signal in synchronism with the clock signal to the gate signal line of the liquid crystal panel 137

Figure 12:
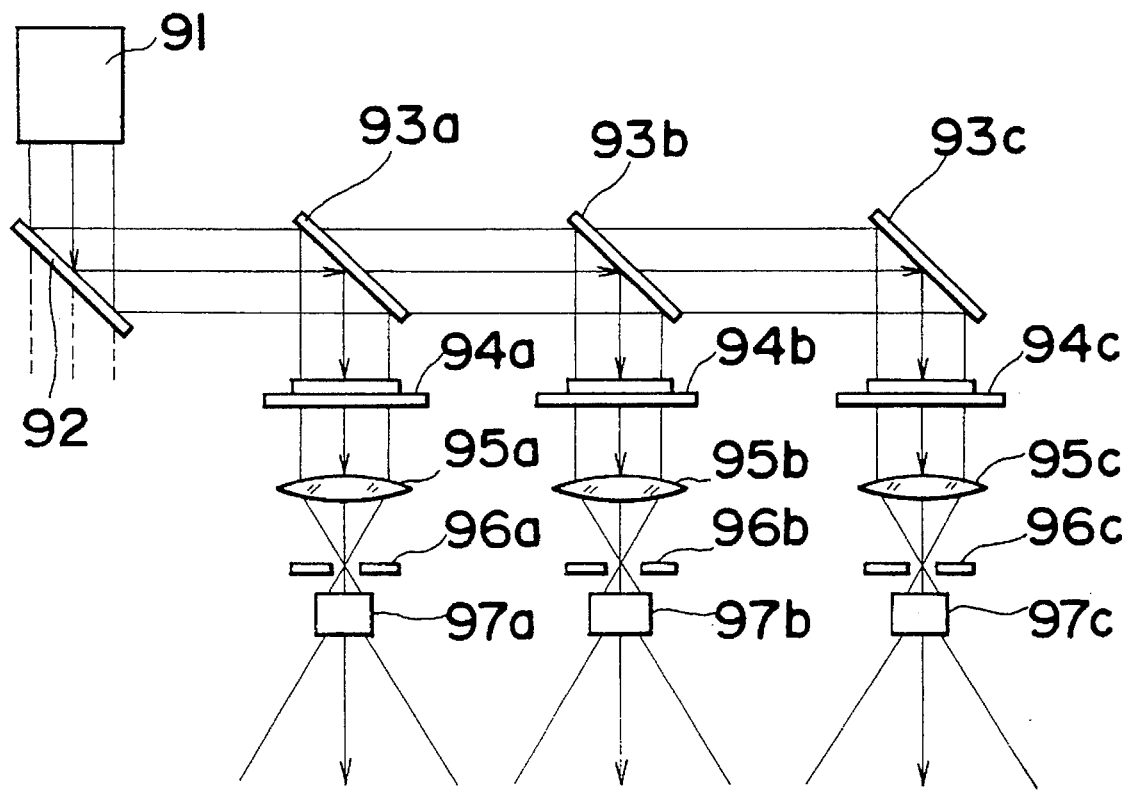
FIG. 12 is a schematic view of an LCD image projection type television system according to the present invention.

A liquid crystal display image projection type television system of an embodiment according to the present invention will be explained below. FIG. 12 shows a liquid crystal display image projection type television system using of three liquid crystal panels 94a, 94b and 94c according to the present invention. It is noted here that components unnecessary for the explanation have been omitted. Reference numeral 91 denotes a light convergence optical system including a concave mirror as well as a metal halide lamp or a xenon lamp serving as a light emitting means. Preferably, the lamp has an arc length as short as possible. Generally, a xenon lamp of an arc length of 2 mm or shorter is sufficient for use in the liquid crystal display image projection type television system. However, it has a disadvantage of a short lifetime. A metal halide lamp of around 250 W has an arc length of about 6 mm which is too long for practical use. The arc length is preferably 5 mm or less, and more preferably 4 mm or less. A metal halide lamp may have a short arc length of a small power dissipation. For instance, a metal halide lamp having a power dissipation of 120 W and an arc length of about 3 mm is available and it is preferable for a liquid crystal display image projection type television system according to the present invention. The concave mirror and the F value of the projection lens can be designed to have appropriate specifications corresponding to the arc length of the lamp. For instance, the F value of the projection lens is set at about F8 when the arc length is 4 mm, or at about F10 when the arc length is 3 mm. In the present embodiment, a metal halide lamp having an arc length of 3 mm, a spherical concave mirror, and a projection lens having an F value of F10 are used.

Reference numeral 92 denotes a UVIR cut-off filter permitting transmission of only visible light by reflecting infrared and ultraviolet rays. Reference numeral 93a denotes a dichroic mirror for reflecting a blue component, reference numeral 93b denotes a dichroic mirror for reflecting a green component, and reference numeral 93c denotes a dichroic mirror for reflecting a red component. It is to be noted that the order in arrangement of the blue dichroic mirror 93a through the red dichroic mirror 93c is not limited to the order in arrangement as shown in FIG. 12. The last red dichroic mirror 93c may be replaced by a total reflection mirror naturally.

Reference numerals 94a, 94b, and 94c denote the liquid crystal display panels of the above-mentioned embodiments, and the three display panels 94 are used as light valves. The liquid crystal display panel 94c for modulating the red light component is so constructed that the average pore size is larger than those of the others 94a and 94b, and the thickness of liquid crystal panel 94c is made thicker than those of the others 94a and 94b because the light scattering characteristic is gradually degraded according as the light wavelength becomes longer to reduce the contrast. The thickness of the liquid crystal film can be adjusted by varying the diameter of the beads in the liquid crystal layer.

Reference numerals 95a, 95b, and 95c denote lenses, reference numerals 97a, 97b, and 97c denote projection lenses, and reference numerals 96a, 96b, and 96c denote aperture stops. It is noted that the optical components 95, 96 and 97 constitute a light projection optical system. It is noted that the aperture stops are illustrated to explain the operation of the liquid crystal display image projection type television system. The aperture stops are provided for defining the converging angles of the projection lenses, and therefore they can be considered to be included in the function of the projection lens. The aperture size can be considered to be small if the F value is large. In order to obtain a high contrast image display, it is better that the projection lenses 97 have larger F values. However, the luminance is reduced in performing a white display when the F values are large.

Next, the operation of the liquid crystal display image projection type television system of the present invention is explained. Because the modulation system of the red, green, and blue light components are substantially the same, only the modulation system of the blue light component is explained as an example. First, white light is irradiated from the light: convergence system 91, and the blue component of the white light is reflected at the blue dichroic mirror 93a. The blue component is incident on the display panel 94a. The display panel 94a controls the scattering and transmission conditions of the incident light according to a signal applied to the pixel electrodes as explained with use of FIGS. 2(a) and (b) for modulating the light. The scattered light is condensed by the lens 95a and only the parallel light or the light in a certain range of angle is transmitted through the aperture 96a. The modulated light is projected onto a screen (not shown) after magnified by the projection lens 97a. Thus, the blue component is projected on the screen. In the same manner, the display panel 94b modulates the green component, while the display device 94c modulates the red component, thereby displaying a color image on the screen.

Although an image is magnified by three projection lenses 97 in FIG. 12, the outgoing light from the three liquid crystal display panels 94a, 94b and 94c can be synthesized into a single optical path with an optical system to project an image with a single projection lens.

Figure 13:
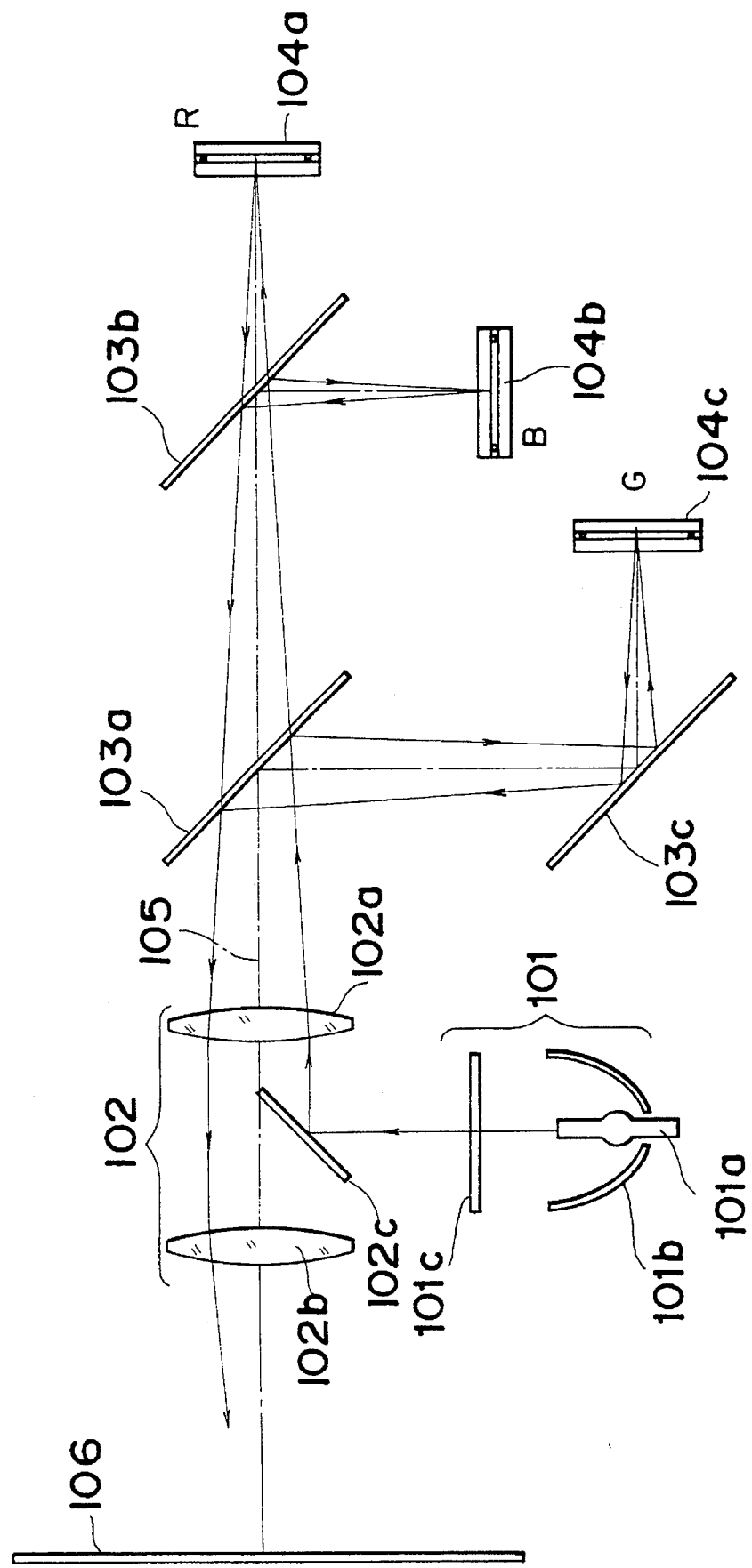
FIG. 13 is a schematic view of another LCD image projection type television system according to the present invention.

FIG. 13 shows a reflection type of a liquid crystal display image projection type television system using reflection type display panels 104a, 104b, 104c (104) which are the same as that shown in FIG. 5 except that the pixel electrodes and the like are made from a metal such as aluminum as reflection electrodes. A light source 101 is composed of a lamp 101a, a concave mirror 101b, and a filter 101c. The lamp 101a is a metal halide lamp having an arc length of 4 mm or shorter similarly to that in FIG. 12. The concave mirror 101b is made of glass, and a multi-layer film for reflecting visible light and transmitting infrared and ultraviolet rays are deposited on a reflection surface of the mirror. The visible components included in the light emitted from the lamp 101a are reflected on the reflection surface of the concave mirror 101b, and infrared and ultraviolet components are removed from the light reflected on the concave mirror 101b by means of a filter 101c.

The projection lens 102 is comprised of a first lens group 102a disposed on the side of the liquid crystal panels 104 and a second lens group 102b disposed on the side of a screen 106. Between the first and second lens groups 102a and 102b is provided a plane mirror 102c. Scattered light emitted from a pixel located at the center of each display panel 104 is transmitted through the first lens group 102a, where a lower half of the light with respect to the optical axis 105 in the drawing is incident on the plane mirror 102c, and the remaining light is incident on the second lens group 102b instead of the plane mirror 102c. The normal of the plane mirror 102c is inclined at an angle of 45° with respect to the optical axis 105 of the projection lens 102.

The light emitted from the light source 101 is reflected on the plane mirror 102c and transmitted through the first lens group 102a to be incident on the liquid crystal panel 104. Light reflected on the liquid crystal panel 104 is transmitted through the first lens group 102a and the second lens group 102b in this order to reach the screen 106. The optical system is designed in such a manner that a light beam emitted from the center portion of the projection lens 102 and directed along the optical axis 105 to the display device 104 is incident on the liquid crystal layer of the liquid crystal panel approximately perpendicularly, i.e., in a telecentric manner.

For simplicity of explanation, it is assumed that the display panels 104c, 104b and 104a modulate the green, blue and red components, respectively.

Reference numerals 103a, 103b, and 103c denote dichroic mirrors which concurrently serve both as a color synthesis and as a color separation system. White light emitted from the light source 101 is reflected by the plane mirror 102c to be incident on the first group 102a of the projection lens 102. In the above case, unnecessary light components are cut off by the filter 101c having its half bandwidth of 430 nm to 690 nm. Hereinafter, each optical band is represented by its half bandwidth value. The dichroic mirror 103a reflects the green component and transmit the red and blue components. The green component is subjected to eliminate a band by the dichroic mirror 103c to be incident on the liquid crystal panel 104b. The band of the green component is 510 to 570 nm. On the other hand, the dichroic mirror 103b reflects the blue component and transmits the red component. Similarly, the blue component is incident on the liquid crystal panel 104c, while the red component is incident on the liquid crystal panel 104a. The blue component has a band of 430 to 490 nm, while the red component has a band of 600 to 690 nm. Each display panel forms an optical image by changing the scattering state of light according to video signals. Optical images formed by the display devices 104 of the three colors are synthesized by the dichroic mirrors 103a and 103b and then magnified and projected by the projection lens 102 on the screen 106. It is noted that bandwidths of the red, green and blue components have almost common values. Though dichroic mirrors are used in FIGS. 12 and 13, dichroic prisms may also be used instead of dichroic mirrors.

By using the reflection type liquid crystal display panel having a high contrast and a high pixel numerical aperture, a high-luminance image display can be achieved. Furthermore, since no obstacle exists behind the liquid crystal display panel, the panel can be cooled easily. For instance, a forced air cooling from behind the panel can be easily utilized, or a heat sink or the like can be easily attached to the rear surface of the panel.

Figure 14A:
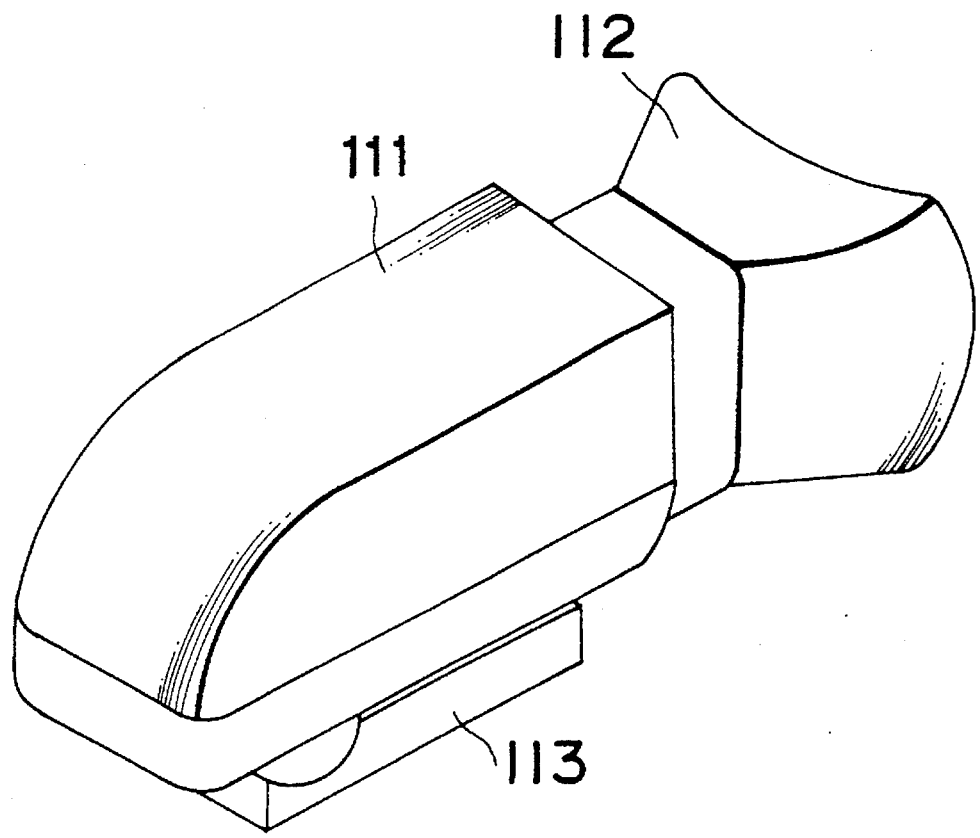
FIG. 14(a) is an external schematic view of a viewfinder employing a display device of the present invention.
Figure 14B:
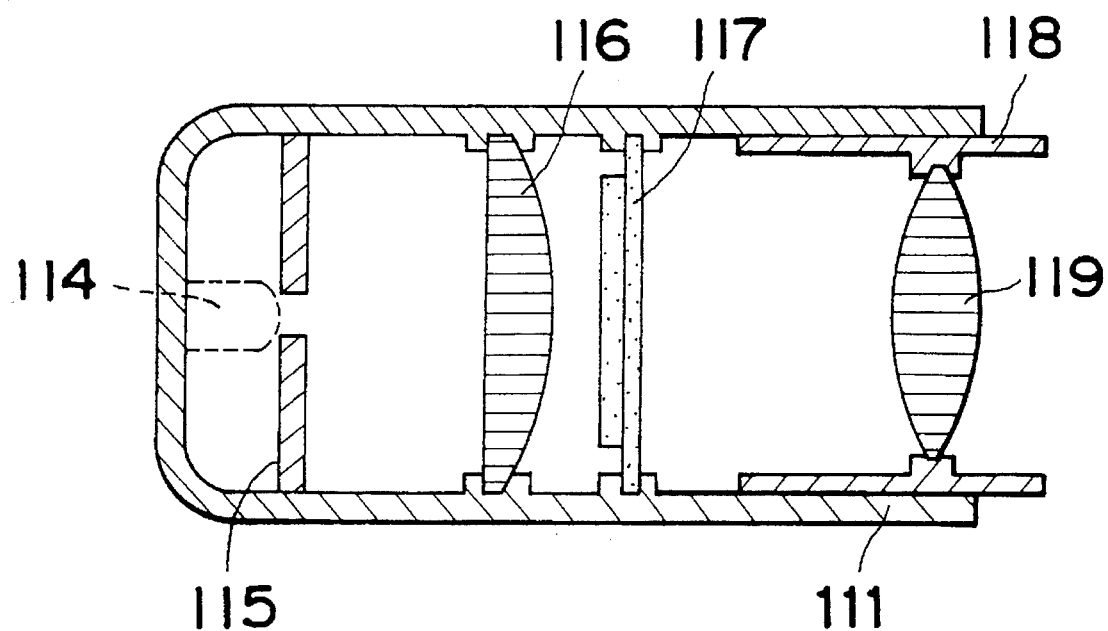
FIG. 14(b) is a sectional view of an essential part of the viewfinder shown in FIG. 14(a)

FIGS. 14(a) and 14(b) show a viewfinder of the present invention. Reference numeral 111 denotes a body of a viewfinder with a metal fitting 113, numeral 114 denotes a light emitting element, numeral 116 denotes a convergence lens, and numeral 117 denotes a display panel of the embodiments as explained above. For instance, a display region of the liquid crystal panel 117 has a diagonal length of 28 mm, while the convergence lens 116 has an effective diameter of 30 mm and a focal distance of 15 mm. The light emitting element ].14 is arranged in the vicinity of the focal point of the convergence lens 116. The convergence lens 116 is a plano-convex lens with its plane surface faced to the light emitting element 114. An eyepiece ring 118 is provided at an end portion of the body 111. In the eyepiece ring 118 is mounted a magnifying lens 119. The body 111 has an internal surface with a black or dark color to absorb unnecessary light components.

Reference numeral 115 denotes a light shading plate having a circular throughhole at its center. More concretely, the plate 115 is a pinhole plate for reducing the region from which the light is emitted. If the area of the hole is increased, an image on the display device is enlarged, but the contrast becomes low. This is because the directivity of the incident light degrades though the quantity of the light incident on the convergence lens 116 increases. If the display region of the display device has a diagonal length of 28 mm as described above, the area to emit the light shall be about 15 mm² or smaller, which corresponds to a pinhole of about 4 mm or less in diameter. More preferably, the area shall be 10 mm² or smaller. However, when the pinhole diameter becomes too small, the directivity of light is narrowed more than necessary. Then, even if a viewing point of the image on the view finder is moved only a little bit, an image becomes significantly dark. Therefore, the area of the hole shall be at least 2 mm². For instance, when the hole diameter is 3 mm, a display image luminance equal or superior to that of the conventional view finder with a plane light source can be obtained. The hole diameter shall be in the range of 0.5 to 5 mm. If the diagonal length of the display screen is larger than 28 mm, the hole diameter is required to increase in correlation to the diagonal length. An area ratio of the display area to the area of the hole for emitting the light must be not greater than 20:1, more preferably, not greater than 40:1. However, in view of the angle of visibility the ratio is preferably not smaller than 200:1.

Light emitted from the light emitting element 115 at a wide solid angle is converged into an approximately parallel light having a narrow directivity by the convergence lens 116 to be incident on the side of an opposite electrode (not shown) of the liquid crystal panel 117. The liquid crystal panel 117 forms an image by changing the degree of transmittance or scattering of light of its liquid crystals according to a video signal applied to the liquid crystal panel 117. An observer is to observe the display image on the liquid crystal panel 117 by putting his or her eyes close to the eyepiece ring 118 or the eyepiece cover 112. In other words, the eye point of the observer is almost fixed in this system. If all the pixels of the liquid crystal panel 117 are assumed to pass the light in a straight line, the convergence lens 116 is so designed that the light emitted from the light emitting element 114 to be incident on the effective region of the convergence lens 116 wholly propagates to the eye of the observer after passing through a magnifying lens 119. Thus, the observer can observe a magnified image of the small display image at the liquid crystal panel 117.

Since the eye point of the observer is almost fixed by the eyepiece cover 112 of the viewfinder, the light source arranged rearward is allowed to have narrow directivity. In a conventional viewfinder using a fluorescent lamp light box as a light source, only a light travelling from a region having the same display region of the liquid crystal panel at a small solid angle in a specific direction is utilized and light travelling in the other directions are not utilized. In other words, a efficiency for utilizing the light is very low.

According to the present embodiment, a light source having a small light emitting element 114 is used and the light emitted from the light emitting element 114 at a wide solid angle is converted into an approximate parallel light with the convergence lens 116. Thus, the light going out of the convergence lens 116 has narrow directivity. When the visual point of the observer is fixed, the light having narrow directivity can be sufficient even for the viewfinder. When the light emitting element is small in size, the power dissipation is small eventually. As described above, the viewfinder of the present embodiment takes an advantage of that the observer observes the display image with his or her eye point fixed. Although a certain viewing angle is necessary for a prior art normal direct-vision liquid crystal display device, it is practically acceptable for the viewfinder that the display image thereof can be viewed well in a specified direction.

When the convergence lens 116 has no aberration and a transmittance of 100%, the luminance of the light emitting element 114 viewed through the convergence lens 116 is equal to the luminance of the light emitting element 114 itself. Assuming that an liquid crystal display including a color filter, numerical aperture and other factors has its maximum transmittance of 3%, the convergence lens 116 has a transmittance of 90%, and a luminance required for a view finder is 15 (ft-L), the necessary luminance of the light source is about 560 (ft-L). A light emitting body satisfying the above-mentioned conditions includes a self-light-emitting devices of: light emitting tubes utilizing the light emitting principles of cathode-ray tube, fluorescent lamp or the like; devices using electrons such as a fluorescent light emitting element, a tungsten lamp, a light emitting diode, and an electro-luminescent lamp; and devices using an electric discharge such as a plasma display panel. Any of the above-mentioned devices can be used as the light emitting means, but the light emitting tubes and a light emitting diode are most preferable due to their low dissipation power, compactness, white light emission and the like.

A mosaic color filter (not shown) is attached to the liquid crystal panel 117. The pixels are arranged in a delta form, and the number of the pixels is 55,000. The color filter transmits any one of red, green and blue components. The film thickness of the liquid crystal layer of each color may be controlled according to the structure of the color filter. The color filter thickness can be adjusted in the production process. In other words, the film thickness of the color filters are made different for red, green and blue components. By controlling the film thickness of each color filter, the thickness of the liquid crystal film on each pixel can be adjusted according to the thickness of each color filter. In particular, any liquid crystal panels employing polymer dispersed liquid crystals have a worse light scattering characteristic at long wavelengths (red components). Therefore, the liquid crystal layer thickness for the red pixels is made greater than those of the blue and green pixels to improve the scattering characteristic and to make the gradation characteristic of red, green and blue even. The average pore size is changed for the colors of the filter as shown in FIG. 5. The liquid crystal panel shown in FIG. 7 may also be used.

The convergence lens 116 is so arranged that its plane surface, i.e., the surface having a greater curvature faces to the light emitting element 114. The above arrangement is adopted to satisfy the sine condition to thereby assure a good uniformity in luminance of a display image on the liquid crystal panel 117. It is noted that the convergence lens 116 is not limited to the aforementioned plano-convex lens, and it may be a normal convex lens.

By adjusting the degree of insertion of the eyepiece cover 118 into the body 111, a focus adjustment can be adjusted according to the eyesight of the observer. When the eye point is fixed, the observer can observe the display image well even when the directivity of the light toward the liquid crystal panel 117 is narrow. In order to observe the image better, it is only necessary to move the direction of light emitted from the light emitting element 114 in an appropriate direction. Therefore, it is preferred that the light emitting element 114 be provided with a position adjustment mechanism for moving the element depthwise or laterally.

When using a light emitting tube of a miniature tamp type, it is advisable to use a white light emitting type miniature lamp of the Lunalight series (having a diameter of 7 mm or 10 mm) provided by Minipilo Electric Co., Ltd. When using a rod-shaped cold-cathode fluorescent lamp, a lamp of Model No. 5-C21T26E85H manufactured by Matsushita Electric Industrial Co., Ltd. is available. The abovementioned light emitting tube or cold-cathode fluorescent lamp is provided such that the light is emitted from a very small region with a light shading plate 115 or the like, to be used as the light emitting element 114.

Since the viewfinder of the present embodiment can use a small light source, a power dissipation which is smaller than that of a light box employing a conventional fluorescent tube can be assured. Furthermore, the entire body of the viewfinder can be more compact. Use of the polymer dispersed liquid crystals obviates the need of the polarizing plates, while achieving a high use efficiency of light to permit a reduced power consumption.

Figure 15:
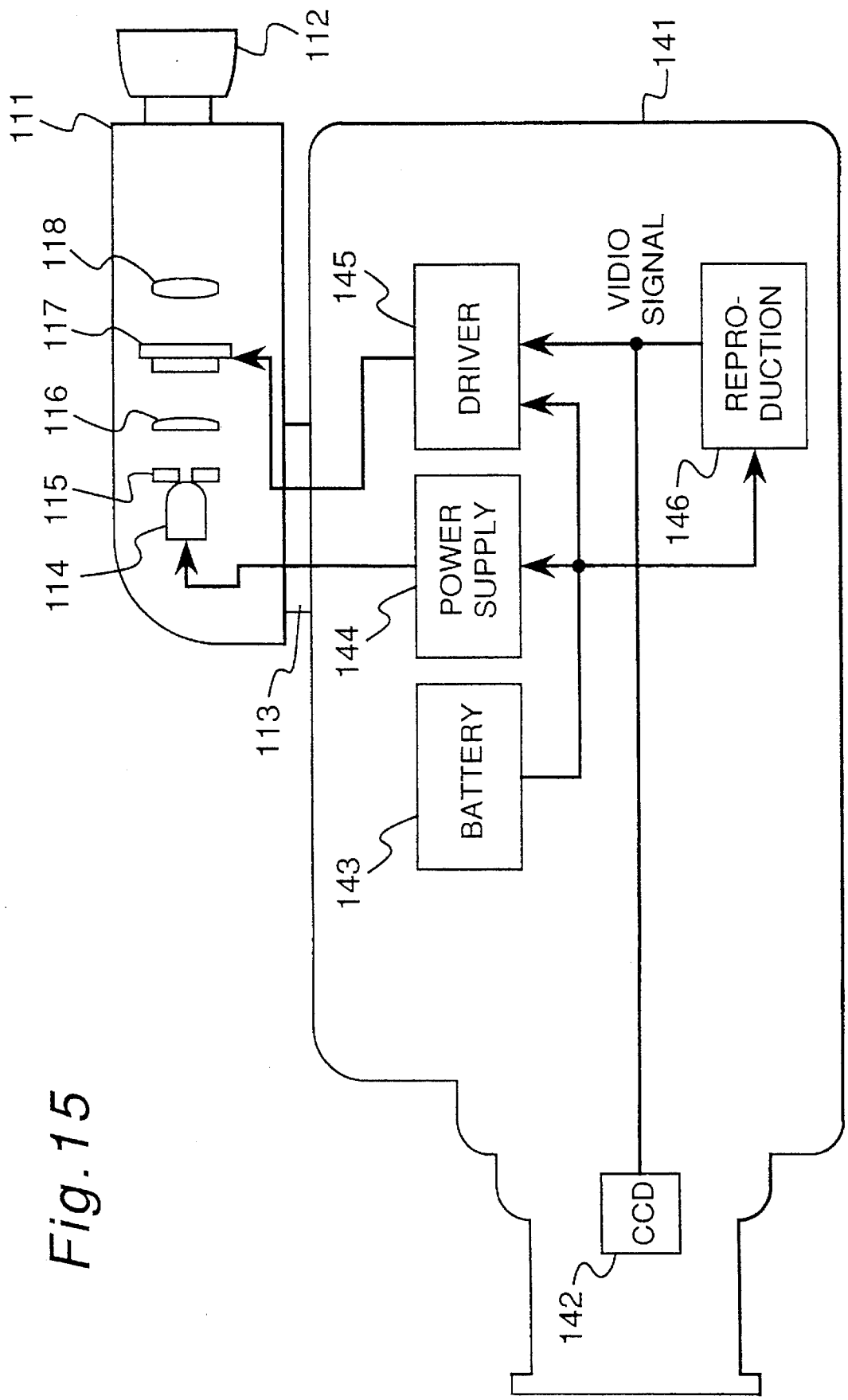
FIG. 15 is a block diagram of a video camera.

FIG. 15 illustrates a video camera where a view finder of the present embodiment shown in FIGS. 14(a) and 14(b) is mounted. The body 111 of the view finder is mounted to the body of the video camera by means of the metal fitting 113. With regard to the liquid crystal panel 117, the display screen has a diagonal length of 28 mm (1.1 inch). A light emitting tube (Lunalight-07 series) manufactured by Minipilo Electric Co., Ltd. is used as the light emitting element 114, and it has a diameter of 7 mm. The tube is a three-wavelength color light emission type to provide white light. A power supply 144 for the light emitting tube supplies a heater voltage of 2.5 V and an anode voltage of 18 V to the light emitting tube 114. Both voltages are DC voltages. The power supply 144 has a circuit for modulating the anode voltage with pulse signal cycle of 60 Hz. By using the pulse signal as the voltage applied to the anode, the quantity of light emitted from the light emitting tube 114 can be varied in proportion to the pulse width. The pulse width can be continuously varied from 0 (0%) to 1/1 (100%) by rotating a variable resistor provided at the video camera. In an embodiment, the luminance of the light emitting tube 114 is about 800 (ft-L) when the pulse width is 1/2 (50%). In the condition of 1/1, i.e., when the anode voltage is continuously applied, a doubled luminance of 1600 (ft-L) is achieved. When the luminance of the light emitting tube 114 is about 800 (ft-L), the power dissipation of the light source section is about 0.25 W. Meanwhile, a video signal is output from a CCD sensor 142 to display an image on the liquid crystal panel 117 by a drive circuit 145. Similarly, a video signal recorded in a video tape is reproduced by a reproduction circuit 146 to be applied to the video amplifier 41 to display an image on the liquid crystal panel 117 by the drive circuit 145. Reference numeral 143 denotes a battery attached to the video camera to supply an electric power to the power supply circuit 144, the drive circuit 145, and the reproduction circuit 146. The conventional viewfinder employing a TN liquid crystal display panel dissipates a power of about 1.0 W, whereas the viewfinder of the present embodiment dissipates a power of about 0.3 W. This means that the power dissipation is reduced to one third that of the prior art.

Though the projection lens system used in FIG. 12 is an aperture optical system using an aperture, a different system may also be used such as an optical system having a shading member provided at the center of a path of the converged parallel beam.

Further, two-terminal elements such as diodes may also be used as switching elements of the liquid crystal panel.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as being included therein.

What is claimed is:

1. A liquid crystal panel comprising:

a first substrate having pixel electrodes arranged as a matrix;

a second substrate having a counterelectrode; and a liquid crystal/polymer composite consisting of a liquid crystal component and a polymer component, said composite being interposed between said first and second electrode substrates, and said composite comprising of a first region and a second region defined on each of said pixel electrodes, an average pore size of said polymer component in said first region being different from that of said second region.

2. The liquid crystal panel according to claim 1, wherein said polymer component included in said liquid crystal/polymer composite comprises an ultra-violet ray setting resin.

3. The liquid crystal panel according to claim 1, further comprising: switching elements formed on said first substrate each arranged for a pixel electrode and signal lines for applying signals to the switching elements and the pixel electrodes; and shading films applied to said switching elements.

4. The liquid crystal panel according to claim 3, said liquid crystal/polymer composite further comprising third regions defined between said pixel electrodes, wherein an average pore size in said first and second regions is larger than that in said third regions.

5. The liquid crystal panel according to claim 1, said liquid crystal/polymer composite further comprising third regions defined between said pixel electrodes, wherein an average pore size in said first and second regions is larger than that in said third regions.

6. A liquid crystal panel comprising:

a first substrate having pixel electrodes arranged as a matrix;

a second substrate having a counterelectrode; and a liquid crystal/polymer composite consisting of a liquid crystal component and a polymer component; said composite being interposed between said first and second electrode substrates, and said composite comprising first regions defined on said pixel electrodes and second regions defined between said pixel electrodes, an average pore size in said first regions being larger than that in said second regions.

7. The liquid crystal panel according to claim 6, further comprising a color filter provided above said first or second substrate, wherein said color filter has red regions, green regions, and blue regions, each of said regions being arranged in correspondence to one of said pixel electrodes, an average pore size of said polymer component provided above said red regions being larger than that above said green regions, or above said blue regions.

8. The liquid crystal panel according to claim 6, wherein said polymer component included in said liquid crystal/polymer composite comprises an ultra-violet ray setting resin.

9. The liquid crystal panel according to claim 6, wherein an average pore size of said polymer component in said second regions is smaller than that in said first regions and is equal to or less than a wavelength of the incident light into said liquid crystal/polymer composite.

10. The liquid crystal panel according to claim 6, further comprising: switching elements arranged on said first substrate for each pixel and signal lines for applying signals to the switching elements and the pixel electrodes; and shading films applied to said switching elements.

11. A viewfinder for a video camera comprising:

a light source;

converging means for converging a light emitted from said light source into a parallel light;

a liquid crystal panel for modulating light output from said light converging means, said liquid crystal panel comprising: a first substrate having pixel electrodes arranged as a matrix; a second substrate having a counterelectrode; a liquid crystal/polymer composite consisting of a liquid crystal component and a polymer component, said composite being interposed between said first and second electrode substrates, and said composite comprising first regions defined on said pixel electrodes and second regions defined between said first regions on said pixel electrodes, an average pore size in said first regions being larger than that in said second regions, and an average pore size of said polymer component in said second region being smaller than that in said first regions and being equal to or less than a wavelength of the incident light into said liquid crystal/polymer composite.

12. The viewfinder according to claim 11, further comprising:

a magnification means for magnifying a display image formed by said liquid crystal panel, said light converging means causing light emitted from said light source to arrive through said liquid crystal panel at a position where an observer can see the magnified display image; and an eyepiece cover for fixing an eye point of an observer, said eyepiece cover being arranged between said magnification means and a position where said observer can see the light or between said liquid crystal panel and said position.

13. The viewfinder according to claim 11, wherein said convergency lens is a plano-convex lens having a plane surface thereof facing said light source; said light source comprising a light emitting element and a pin hole plate, said pin hole plate being arranged so that light emitted from the light emitting element radiates through the pin hole.

14. The viewfinder according to claim 11, further comprising a color filter provided above said first or second substrate, wherein said color filter has red regions, green regions, and blue regions, each of said regions being arranged in correspondence to one of said pixel electrodes, an average pore size of said polymer component above the red regions being larger than that above said green regions, or above said blue regions.

15. The viewfinder according to claim 11, wherein switching elements arranged for each pixel and signal lines for applying signals to the switching elements and the pixel electrodes are formed on said first substrate, and shading films are applied to said switching elements.

16. A projection display system comprising:

a light source;

a liquid crystal panel comprising: a first substrate having pixel electrodes arranged as a matrix; a second substrate having a counterelectrode; and a liquid crystal/polymer composite consisting of a liquid crystal component and a polymer component, said composite being interposed between said first and second electrode substrates, and said composite consisting of a first region and a second region defined on each of said pixel electrodes, an average pore size of said polymer component in said first regions being different from that of said second regions;

an optical system comprising a plurality of optical components for introducing a light emitted by said light source to said liquid crystal panel;

a drive means for applying signals to said liquid crystal panel to display an image; and a projection lens for projecting the light modulated by said display panel.

17. The projection display system according to claim 16, further comprising dichroic mirror dividing light emitted by said light source into three light beams of three wavelengths of blue, green, and red, wherein said liquid crystal panel is arranged for each of optical paths of said three wavelengths.

18. A projection display system comprising:

a light source;

a liquid crystal panel comprising: a first substrate having pixel electrodes arranged as a matrix; a second substrate having a counterelectrode; and a liquid crystal/polymer composite consisting of a liquid crystal component and a polymer component, said composite being interposed between said first and second electrode substrates, and said composite comprising first regions defined on said pixel electrodes and second regions defined between said pixel electrodes, wherein an average pore size in said first regions is larger than that in said second regions;

an optical system comprising a plurality of optical components for introducing light emitted by said light source to said liquid crystal panel;

a drive means for applying signals to said liquid crystal panel to display an image; and a projection means for projecting light modulated by said display panel.

19. The projection display system according to claim 18, wherein switching elements arranged for each pixel and signal lines for applying signals to said switching elements and said pixel electrodes are formed on said first substrate, and shading films are applied to said switching elements.

20. The projection display system according to claim 18, further comprising a dichroic mirror for dividing light emitted by said light source into three light beams of wavelengths of blue, green, and red, and two additional liquid crystal panels, wherein said liquid crystal panel and two additional liquid crystal panels are arranged so that one panel is disposed in each of the optical paths of said three wavelengths.

21. The projection display system according to claim 20, wherein projection means are provided for each of said liquid crystal panels and said projection means are arranged so that optical images modulated by said liquid crystal panels are projected at the same position on a screen.

22. A liquid crystal panel comprising:

a first substrate having pixel electrodes arranged as a simple matrix;

a second substrate having a second electrode; and a liquid crystal/polymer composite consisting of a liquid crystal component and a polymer component, said composite being interposed between said first and second substrates;

wherein an average pore size of said polymer component in first regions over the pixel electrodes is larger than that of said polymer component in second regions defined between the first regions.

23. The liquid crystal panel according to claim 22, wherein the average pore size of said polymer component in said first region is between 1 and 2 μm.

24. A liquid crystal panel comprising:

a first substrate having pixel electrodes arranged as a matrix, switching elements arranged for each pixel and signal lines for applying signals to the switching elements and the pixel electrodes;

a second substrate having a counterelectrode;

a liquid crystal/polymer composite consisting of a liquid crystal component and a polymer component, said composite being interposed between said first and second electrode substrates; and shading films applied to said switching elements;

wherein an average pore size of said polymer component in regions over the pixel electrodes is larger than that of said polymer component existing between the regions.

* * * * *